(12) United States Patent
Allione

(10) Patent No.: US 8,292,429 B2
(45) Date of Patent: Oct. 23, 2012

(54) OPHTHALMIC LENS

(76) Inventor: Pascal Allione, Charenton-le-Pont (FR)

( * ) Notice: Subject to any disclaimer, the term of this patent is extended or adjusted under 35 U.S.C. 154(b) by 600 days.

(21) Appl. No.: 12/513,627

(22) PCT Filed: Oct. 30, 2007

(86) PCT No.: PCT/FR2007/001802
§ 371 (c)(1),
(2), (4) Date: May 5, 2009

(87) PCT Pub. No.: WO2008/065266
PCT Pub. Date: Jun. 5, 2008

(65) Prior Publication Data
US 2010/0060851 A1    Mar. 11, 2010

(30) Foreign Application Priority Data
Nov. 7, 2006   (FR) ...................... 06 09702

(51) Int. Cl.
*G02C 7/02* (2006.01)
*G02C 7/00* (2006.01)
(52) U.S. Cl. ............................. 351/159.42; 351/159.01
(58) Field of Classification Search .................. 351/159, 351/168–172
See application file for complete search history.

(56) References Cited

U.S. PATENT DOCUMENTS

| | | | |
|---|---|---|---|
| 5,270,745 | A | 12/1993 | Pedrono |
| 5,272,495 | A | 12/1993 | Pedrono |
| 5,488,442 | A | 1/1996 | Harsigny et al. |
| 6,318,859 | B1 | 11/2001 | Baudart et al. |
| 6,955,433 | B1 | 10/2005 | Wooley et al. |
| 7,216,977 | B2 | 5/2007 | Poulain et al. |

FOREIGN PATENT DOCUMENTS

| | | |
|---|---|---|
| FR | 2 489 971 | 3/1982 |
| FR | 2489971 A * | 3/1982 |
| FR | 2 683 642 | 5/1993 |
| FR | 2 699 294 | 6/1994 |
| FR | 2 704 327 | 10/1994 |
| GB | 2 277 997 | 11/1994 |
| WO | 98/12590 | 3/1998 |
| WO | 2004/070426 | 8/2004 |

OTHER PUBLICATIONS

International Search Report for International Application No. PCT/FR2007/001802 dated May 15, 2008.

\* cited by examiner

*Primary Examiner* — James Greece
(74) *Attorney, Agent, or Firm* — Polsinelli Shughart PC

(57) ABSTRACT

A progressive ophthalmic lens includes at least one complex surface having a principal progression meridian. The complex surface has a horizontal reseau of bands and at least one geometrical quantity of the complex surface is substantially equal in all bands of the reseau for a given point of a vertical.

17 Claims, 21 Drawing Sheets

OPHTHALMIC LENS

CROSS-REFERENCE TO RELATED APPLICATIONS

This application is the National Stage of International Application No. PCT/FR2007/001802, filed on Oct. 30, 2007, which claims the priority to French Patent Application Serial No. 06 09 702, filed on Nov. 7, 2006. The contents of all applications are hereby incorporated by reference in their entireties.

FIELD OF THE INVENTION

A subject of the present invention is an ophthalmic lens and a method for determining such an ophthalmic lens.

BACKGROUND

Any ophthalmic lens intended to be held in a frame is related to a prescription. The ophthalmic prescription can include a positive or negative power prescription as well as an astigmatism prescription. These prescriptions correspond to corrections to bring to the wearer of the lenses to correct defects of his vision. A lens is fixed in the frame in accordance with the prescription and with the position of the wearer's eyes relative to the frame.

In the simplest cases, the prescription is reduced to a power prescription. The lens is termed unifocal and has a rotational symmetry. It is simply fixed in the frame in such a way that the wearer's main direction of glance coincides with the axis of symmetry of the lens.

For presbyopic wearers, the value of the power correction is different for far vision and near vision, due to the difficulties of accommodation for near vision. The prescription thus comprises a far-vision power value and an addition (or power progression) representing the power increment between the far vision and near vision; this amounts to a far-vision power prescription and a near-vision power prescription. Lenses suitable for presbyopic wearers are progressive multifocal lenses, these lenses are described for example in FR-A-2,699, 294, U.S. Pat. No. 5,270,745 or U.S. Pat. No. 5,272,495, FR-A-2,683,642, or also FR-A-2,704,327. Progressive multifocal ophthalmic lenses include a far-vision zone, a near-vision zone, an intermediate-vision zone and a substantially umbilical principal progression meridian crossing these three zones. They are generally determined by optimization, based on a certain number of constraints imposed on the different characteristics of the lens. These lenses are all-purpose, in that they are suitable for wearers' differing day-to-day needs.

Families of progressive multifocal lenses are defined, each lens of a family being characterized by an addition which corresponds to the power variation between the far-vision zone and the near-vision zone. More precisely, the addition, labelled A, corresponds to the power variation between a point VL of the far-vision zone and a point VP of the near-vision zone, which are respectively called far-vision control point and near-vision control point, and which represent the points of intersection of the glance and the surface of the lens for far distance vision and for reading vision.

Independently of the power prescription, a wearer may be given an astigmatism prescription. Such a prescription is produced by the ophthalmologist for far vision in the form of a pair formed by an axis value (in degrees) and an amplitude value (in diopters). On a surface, the amplitude value represents the difference $1/R_1 - 1/R_2$ between the principal curvatures; the axis value represents the orientation, with respect to a reference axis and in a conventional direction of rotation, of the maximum curvature $1/R_1$. In terms of prescription, the amplitude value represents the difference between the minimum and maximum powers in a given direction and the axis represents the orientation of the maximum power. The term astigmatism is used for the pair (amplitude, angle); this term is also sometimes used, although this is linguistically incorrect, for the amplitude of the astigmatism. The context allows a person skilled in the art to understand which meaning is intended.

Within the same family of lenses, the addition varies from one lens to the other in the family between a minimum addition value and a maximum addition value. Generally, the minimum and maximum addition values are respectively of 0.75 diopter and 3.5 diopters, and the addition varies from steps of 0.25 diopter front one lens to another of the family.

Lenses with the same addition differ by the value of the mean sphere at a reference point, also called a base. It is possible to choose for example to measure the base at the far-vision control point VL. Thus the choice of a pair (addition, base) defines a group or set of aspherical front faces for progressive multifocal lenses. Generally, it is thus possible to define 5 base values and 12 addition values, i.e. sixty front faces. In each of the bases an optimization is carried out for a given power. Starting from semi-finished lenses, of which only the front face is formed, this known method allows to prepare lenses suited to each wearer, by simple machining of a spherical or toric rear face.

Thus, multifocal progressive lenses generally comprise an aspherical front face, which is the face opposite to the wearer of the spectacles, and a spherical or toric rear face, directed towards the wearer of the spectacles. This spherical or tonic face allows the lens to be adapted to the user's ametropia, so that a progressive multifocal lens is generally defined only by the complex surface of its aspherical face. As it is well known, an aspherical surface is generally defined by the altitude of all of its points. A progressive multifocal lens can thus be defined, at any point on its complex surface, by geometric characteristics comprising a mean sphere value and a cylinder value; these surface characteristics of sphere and cylinder are defined in detail hereafter.

In geometric characterization, the points on the complex surface are referenced in relation to an orthonormalized reference frame (X, Y, Z) linked to the front face of the lens and having their origin at the geometric centre (0, 0) of the lens. By convention, the X axis extends horizontally and the Y axis extends vertically when the lens is considered under the conditions when being worn. The Z axis is normal to the front face of the lens and allows the altitude of each point of the complex surface to be plotted. The principal progression meridian generally coincides with the Y axis in the upper part of the lens—in the far vision zone—and can have a nasal convergence in the lower part of the lens—in the near vision zone.

Moreover, a progressive multifocal lens can also be defined by optical characteristics taking into account the situation of the wearer of the lenses. In fact, the optical laws of ray tracings lead to the appearance of optical defects when the rays deviate from the central axis of any lens. Generally, the aberrations known as power defects and astigmatism defects are considered. These aberrations have already been clearly identified in the prior art and improvements have been proposed. For example, document WO-A-98 12590 describes a method for determination of a set of progressive multifocal ophthalmic lenses by optimization. This document proposes to define the set of lenses by considering the optical characteristics of the lenses and in particular the wearer power and oblique astigmatism, under the conditions when being worn. The lens is optimized by ray tracing, based on the conditions when being worn and the chosen object space.

Document FR-A-2,489,971 describes a progressive multifocal lens on which the lateral aberrations in the progression zone are reduced. This document proposes a lens having spherical surfaces for far vision and near vision connected by at least two quasi-isodistant umbilical lines of the principal progression meridian. The central progressive surface is then constructed, limiting the cylinder to 0.25 diopter, this central surface being continuously, connected to the tangent planes of the far-vision and near-vision zones. The lateral surfaces are then constructed, respecting the conditions of continuous connection with the tangent plane of the surface of the channel and the far-vision and near-vision zones.

Document WO 2004/070426 describes a progressive multifocal lens, the horizontal prismatic differentials of which are controlled along the principal progression meridian. In particular, the horizontal prismatic refringence power varies progressively along the meridian independently of the spherical power progression. Such a lens allows improved comfort to be provided to myopic wearers. This document focuses on the control of the lens meridian, the peripheral zones then being optimized according to any known method.

SUMMARY

The invention proposes a lens which is easier to adapt to than the standard ophthalmic lenses; it allows the wearer to be provided with excellent perception for peripheral vision as well for far-vision as for near-vision. The invention proposes a lens having a complex surface with a reduced cylinder with respect to standard progressive lenses of the same addition. The complex surface of this lens is periodic or quasi-periodic along the X axis; a selected central band around the meridian is duplicated on each side of the meridian in order to create a reseau of symmetrical or juxtaposed bands.

Such a lens makes it possible to limit aberrations such as astigmatism, power defect and horizontal prismatic deviation.

The invention thus proposes a progressive ophthalmic lens having at least one complex surface with a principal progression meridian, said complex surface having under the conditions when being worn, a horizontal reseau of bands, at least one geometrical quantity of the complex surface being substantially equal in all bands of the reseau for a given vertical point.

According to the embodiments, the geometrical quantity of the complex surface substantially equal in all bands of the reseau is chosen from the sphere or cylinder values, the horizontal or vertical differentials of sphere or cylinder, the altitude of the points, the horizontal or vertical differentials of the altitude, or a combination of these quantities.

According to the embodiments, the reseau of bands of the complex surface is periodic or quasi-periodic.

According to an embodiment, the reseau of bands of the complex surface has a central band centred on the principal progression meridian; this central band can have a width comprised between 0.1 mm and 10 mm.

According to an embodiment, the reseau of bands of the complex surface has a central band in which the cylinder variation is less than or equal to 0.25 diopter.

According to an embodiment, the principal progression meridian has a progressive variation of the horizontal prismatic refringence power. The principal progression meridian can also be substantially umbilical.

According to an embodiment, the complex surface is symmetrical with respect to the principal progression meridian.

The invention also proposes a method for the determination of a complex surface of a progressive ophthalmic lens, the method comprising the steps consisting of:
  choosing a complex initial surface having a principal progression meridian with a power addition between a far-vision reference point and a near-vision reference point;
  selecting a central band including the principal progression meridian;
  reproducing the selected central band on both sides of the principal progression meridian;
  constructing the complex surface of the lens by successively reproducing selected bands towards the periphery of the lens.

According to an embodiment, the method further comprises a step consisting of:
  transforming the complex initial surface with a first transformation operator,
  the step of construction of the complex surface then comprising the steps consisting of:
    constructing a complex periodic or quasi-periodic surface by successively reproducing selected bands on a surface corresponding to the initial surface minus the transformed initial surface; and
    adding to this complex periodic or quasi-periodic surface an initial surface transformed with a second transformation operator.

According to the embodiments, the first transformation operator annuls the sphere value at the far-vision control point or reduces the sphere value at the near-vision control point. The second transformation operator can be identical to the first transformation operator.

According to the embodiments, the step of reproducing a selected band consists to juxtaposing the selected band or making the selected band symmetrical.

According to an embodiment, the step of constructing the complex surface of the lens further comprises a step consisting of translating an enlarged or reduced central band in order to juxtapose it with the constructed bands.

The invention also relates to a visual device comprising at least one lens according to the invention and a method for correcting the vision of a presbyopic subject, comprising providing the subject with, or the wearing by the subject of, such a device.

BRIEF DESCRIPTION OF THE DRAWINGS

Other advantages and characteristics of the invention will become apparent on reading the description which follows of the embodiments of the invention, given by way of example and with reference to the drawings which show.

DETAILED DESCRIPTION

Figure 1:
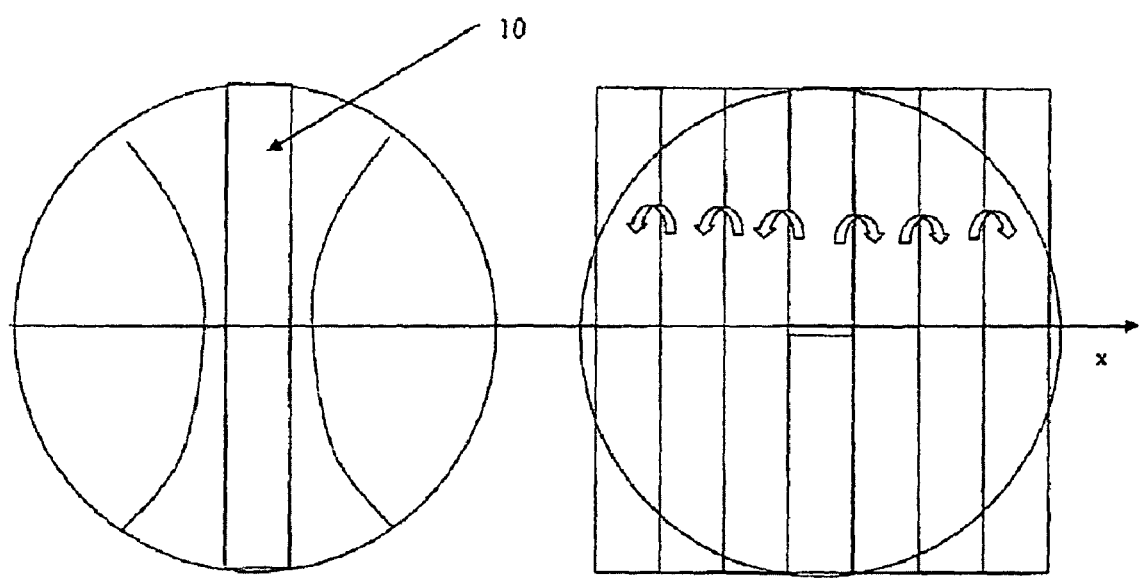
FIG. 1, a schematic diagram of a first embodiment of the method for determining a complex surface according to the invention.

In the remainder of the description, for the sake of simplicity, consideration will be given to a first face of the lens such as the front face, opposite to the wearer, and a second face of the lens such as the rear face, directed toward the wearer.

It is recalled that at any point of a complex surface, it is possible to define principal curvatures $C_1$ and $C_2$ adjusted to the optical index defined as:

$$C_1 = \frac{n-1}{R_1}$$

$$C_2 = \frac{n-1}{R_2}$$

where $R_1$ and $R_2$ are the maximum and minimum local radii of curvature expressed in metres, and n is the index of the material constituting the lens.

It is then possible to define, at any point of the complex surface, a mean sphere Sph given by the formula:

$$Sph = \frac{C_1 + C_2}{2}$$

A cylinder C is also defined, given by the formula:

$$Cyl = |C_1 - C_2|$$

The characteristics of a complex surface on each face of the lens can thus be expressed using the mean sphere and the cylinder.

As mentioned previously, a progressive multifocal lens can be defined, independently of its complex surface(s), by optical characteristics, namely a power and an astigmatism, under conditions when being worn.

For each direction of the glance ($\alpha$, $\beta$), it is possible to define a wearer power and a resulting astigmatism. Reference can be made for example to the definitions given by Thierry Baudart, in the publication "PAL performance analysis for torical prescription", Vision Science and its applications, Santa-Fe N. Mex., February 1996 Technical Digest series Vol. 1. For a direction of glance, an object point M at a given object distance is considered. The points S and T between which the image of the object forms are determined. The image proximity PI is then given by $$PI = \frac{1}{2}\left(\frac{1}{JT} + \frac{1}{JS}\right)$$

while the object proximity PO is the inverse of the distance between the point M and the point J of the sphere of the vertices. The power is defined as the sum of the object and image proximities, i.e.

$$P = PO + PI = \frac{1}{MJ} + \frac{1}{2}\left(\frac{1}{JT} + \frac{1}{JS}\right)$$

The amplitude of the astigmatism is given by $$A = \left|\frac{1}{JT} - \frac{1}{JS}\right|$$

The power and astigmatism can be experimentally measured on the lens using a frontofocometer; they can also be calculated by ray tracing under conditions when being worn.

The invention also proposes a progressive multifocal ophthalmic lens having a complex periodic or quasi-periodic surface. In particular, the complex surface of the lens according to the invention has a horizontal reseau of bands, the horizontal direction being understood as the direction of the X axis in the above-defined orthonormalized reference frame of the lens. The reseau is called horizontal in that the bands of the complex surface are successive along the X axis, each band extending over the whole height of the lens. The bands of the reseau are not necessarily parallel to the Y axis of the lens, or at least are not necessarily parallel to the Y axis over the whole of their height. The bands of the complex surface of the lens constitute a reseau in that they have similar values for certain parameters. In particular, at least one geometrical quantity of the surface is substantially equal from one band to another of the reseau at a given height; i.e. for a given point Y, at least one geometrical quantity remains substantially the same for all bands of the reseau.

This geometrical quantity reproduced from one band of the reseau to another can be, for example, the sphere or cylinder values, the horizontal or vertical variations—the horizontal or vertical differentials—of sphere or cylinder, the altitude values of the points, the altitude horizontal or vertical differentials, or a combination of these quantities. For example, the sphere can be substantially constant with respect to X over the whole of the complex surface of the lens and the cylinder can be substantially zero over the whole of the complex surface of the lens.

The horizontal reseau of bands of the complex surface can be a periodic reseau—each band has the same width—or a quasi-periodic reseau—the bands have a variable width. In particular, in the case of a quasi-periodic reseau, the width of the bands can increase from the centre of the lens towards the periphery of the lens.

Such a complex surface can be obtained by a specific construction consisting of reproducing periodically or quasi-periodically a central band selected around the meridian on a complex initial surface. This central band can be selected in the umbilical channel of the initial surface, i.e. in the zone where the cylinder is low or even zero. The complex surface thus constructed has a limited cylinder over the whole of the surface while providing the required power addition. The initial surface can be chosen according to different criteria respected in the central zone. For example, a progression length, a substantially umbilical progression meridian, a limited cylinder value in the umbilical channel, limit values of sphere or cylinder gradients in the umbilical channel, a progressive variation of the horizontal prismatic refringence power along the principal progression meridian, or other.

FIG. 1 diagrammatically shows a first embodiment of the method for determining a complex surface of a progressive ophthalmic lens according to the invention.

FIG. 1 shows on the left-hand side, a diagrammatic representation of the initial lens with a vertical principal progression meridian and an umbilical corridor delimited by two isocylinder lines. Typically, the value of the isocylinder lines delimiting the central corridor of an ophthalmic lens is 0.25 diopter, but it is understood that other cylinder values can be considered. A central band 10 is then selected, centered on the principal progression meridian. This central band 10 is chosen with a limited width in order to limit the cylinder value and to limit the optical discontinuities during the periodization of the surface. The central band 10 must also be chosen with a minimum width in order to avoid any diffraction of light caused by the periodicity of the reseau and to allow manufacture of the surface using moulding or transfer techniques. A width of the central band 10 comprised between approximately 0.1 mm and approximately 10 mm is suitable to comply with the constraints mentioned above.

FIG. 1 shows on the right-hand side, a diagrammatic representation of the lens according to the invention with the vertical principal progression meridian, the central band (shaded grey) and the horizontal reseau of bands obtained by a periodization of the central band. The central band has firstly been reproduced on both sides of the principal progression meridian; then each band thus reproduced has itself been selected and reproduced towards the periphery of the lens. This band reproduction can consist of making the band symmetrical with the connecting line, serving as an axis of symmetry, as shown in FIG. 1, or juxtaposing the bands side by side. The reproduction of the bands by symmetry allows the continuity of the surface with respect to Z to be retained, but it can only be implemented if the central band is vertical, i.e. if the principal progression meridian is vertical over the whole height of the initial lens. If the principal progression meridian shows a convergence, as described in document FR-A-2,683, 642, the central band will be a curve and the reproduction by symmetry will not be possible; the selected bands will then juxtaposed side by side.

Figure 2:
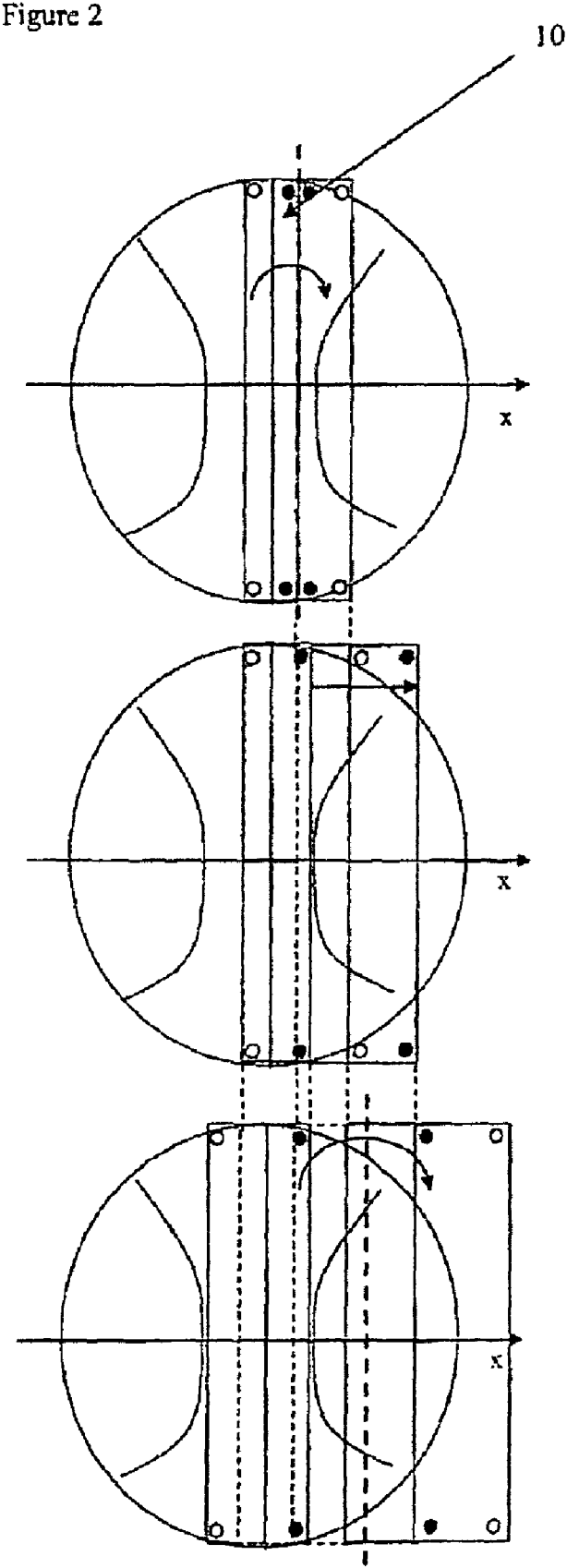
FIG. 2, a schematic diagram of a second embodiment of the method for determining a complex surface according to the invention.

FIG. 2 shows a diagrammatic representation of a second embodiment of the method for determining a complex surface of a progressive ophthalmic lens according to the invention. According to this second embodiment, the horizontal reseau of bands of the complex surface to be constructed is quasi-periodic.

FIG. 2 shows at the top, a diagrammatic representation of the initial lens with a vertical principal progression meridian and an umbilical channel delimited by two isocylinder lines. A central band 10 is selected, centred on the principal progression meridian. This central band 10 is reproduced on each side of the meridian, although the figure only shows the reproduction of the central band on one side. According to the embodiment shown in FIG. 2, the selected band is reproduced by symmetry, but it is understood that a reproduction by juxtaposition could be envisaged.

FIG. 2 shows, in the centre, a step of translation along the horizontal axis which consists of juxtaposing the constructed bands and an enlarged central band.

FIG. 2 finally shows, at the bottom, the repetition of the step of reproduction by symmetry of an again enlarged selected band; the step width of the reseau therefore increases from the centre toward the periphery of the lens; the reseau is quasi-periodic.

The construction of a periodic or quasi-periodic surface can be generalized as follows.

Let $z=S(x,y)$ the equation of the complex initial surface—or reference surface; and let $z=T(x,y)$, the equation of the new quasi-periodized complex surface. In order to construct $T(x, y)$, it is possible to proceed as follows.

A sequence $(x_i)_1$ of alternate numbers is considered, with $x_i>0$ if i is odd, and $x_i<0$ if i is even, and let $x_0=0$. If we assume that $|x_i|>$ is a constant independent of i.

Let $\xi_0=x_0$ $$\xi_{1-1}=\xi_1+|x_{1-1}-x_i|$$

$(\xi_0)_{1-0}$, thus defined form a strictly increasing positive sequence.

It is then possible to define two curves with respect to x ($>0$):

$$\begin{aligned} x_{quasi\_periodic\_1}(x) &= x_{i[x]} + (x - \xi_{i[x]}) & \text{if } i[x] \text{ is even} \\ &= x_{i[x]} - (x - \xi_{i[x]}) & \text{if } i[x] \text{ is odd} \\ x_{quasi\_periodic\_2}(x) &= x_{i[x]} + (x - \xi_{i[x]}) & \text{if } i[x] \text{ is even} \\ &= x_{i[x]+1} - (x - \xi_{i[x]}) & \text{if } i[x] \text{ is odd} \end{aligned}$$

Figure 3:
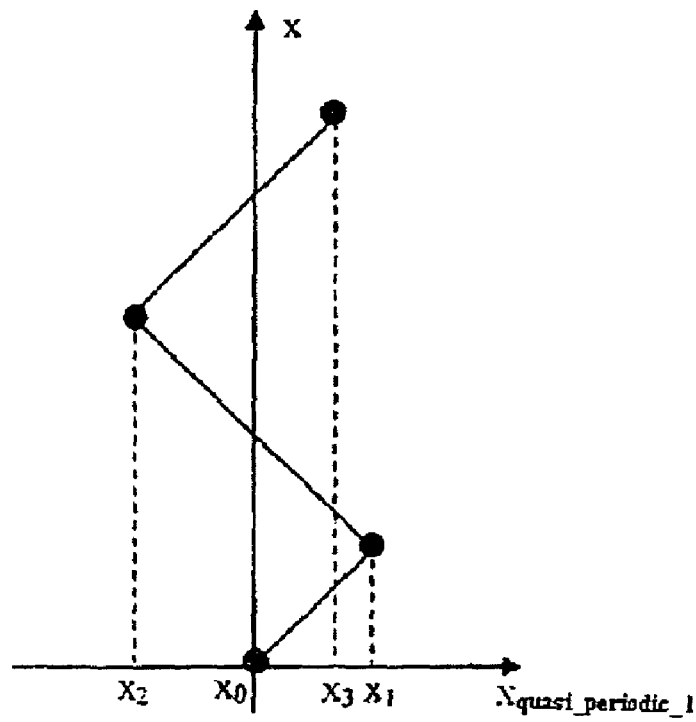
FIG. 3, a graph showing the construction of a quasi-periodic symmetrical reseau.
Figure 4:
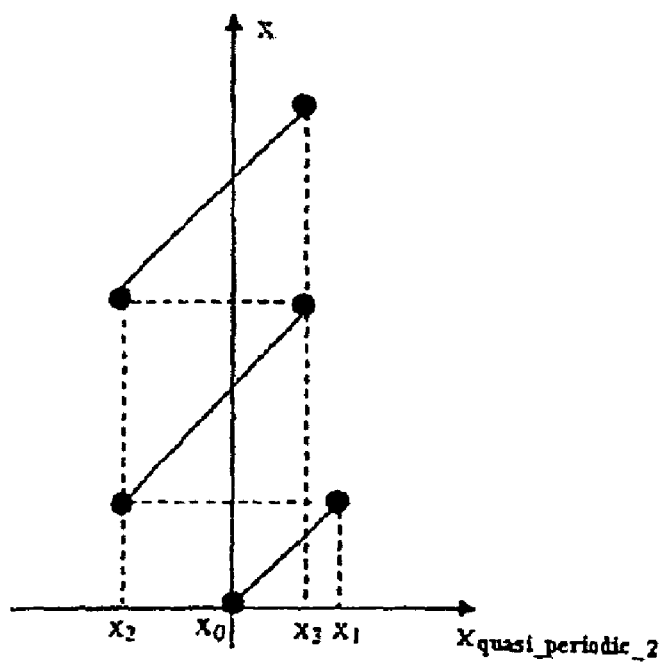
FIG. 4, a graph showing the construction of a quasi-periodic juxtaposed reseau.

FIGS. 3 and 4 show graphically the method of construction of these two curves. For values $x<0$, these two curves are constructed in a same way. It should be noted that the first curve (FIG. 3) is continuous while the second curve (FIG. 4) is discontinuous.

In fact, the first curve (FIG. 3) corresponds to a method of periodization by symmetry. A complex quasi-periodic surface is thus defined by the relationship $z=T(x,y)=S(x_{quasi\_periodic\_1}(x),y)$; this surface being continuous along the axes of equation $x=\xi_i$.

For example, if the $|x_i|$, are constants with $|x_i|=$ reseau step/2 for $i=1\ldots$ a complex surface is then obtained as described with reference to FIG. 1 with a periodic reseau of bands. If the values of $|x_i|$ are increasing, an enlargement of the bands is obtained as the distance from the axis $x=0$ increases and a complex surface is then obtained as described with reference to FIG. 2 with a quasi-periodic reseau of bands.

Moreover, the second curve (FIG. 4) corresponds to a method of periodization by juxtaposition. A quasi-periodic complex surface is thus defined by the relationship $z=T(x,y)=S(x_{quasi\_periodic\_2}(x),y)$; this surface being generally discontinuous along the axes of equation $x=\xi_i$.

For example, if the values of $|x_i|$ are constant with $|x_i|=$ reseau step/2 for $i=1,\ldots$ a periodic complex surface is then obtained with juxtaposed bands of a similar size. If the values of $|x_i|$ are increasing, an enlargement of the bands is obtained as the distance from the axis $x=0$ increases and a complex surface is then obtained as described with reference to FIG. 2 with a reseau of quasi-periodic bands.

The equations defined above for defining the periodized complex surface remain valid when the meridian is not vertical and the selected central band is not vertical.

Let $x=\delta(y)$ be the equation of the meridian; the two same types of periodization by symmetry and by juxtaposition can then be carried out as in the case of a vertical meridian, by letting:

$$T(x,y)=S(x_{quasi\_periodic\_1}(x-\delta(y))+\delta(y),y)$$

$$T(x,y)=S(x_{quasi\_periodic\_2}(x-\delta(y))+\delta(y),y)$$

Figure 5:
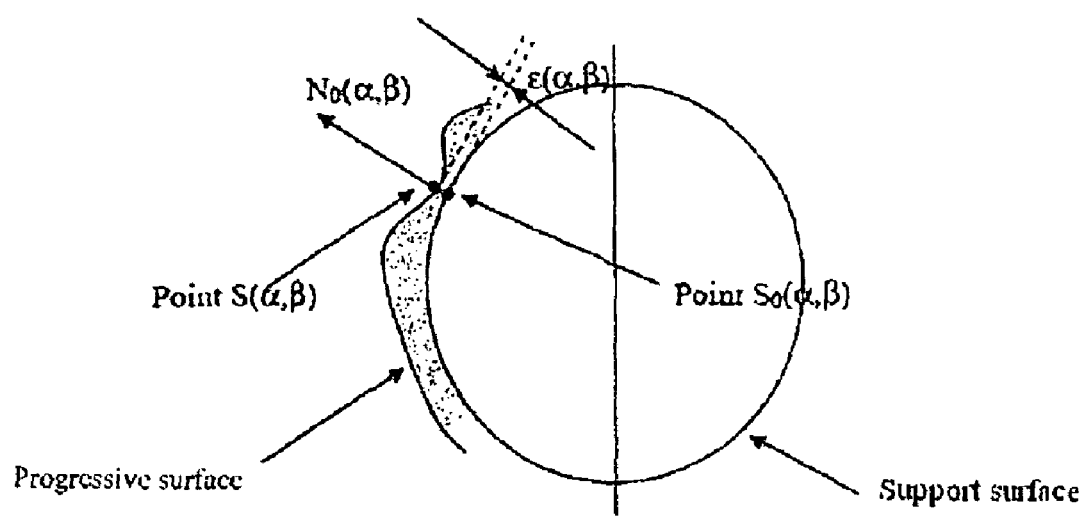
FIG. 5, a diagram showing the decomposition of a complex surface into two layers, one of which is spherical.
Figure 6:
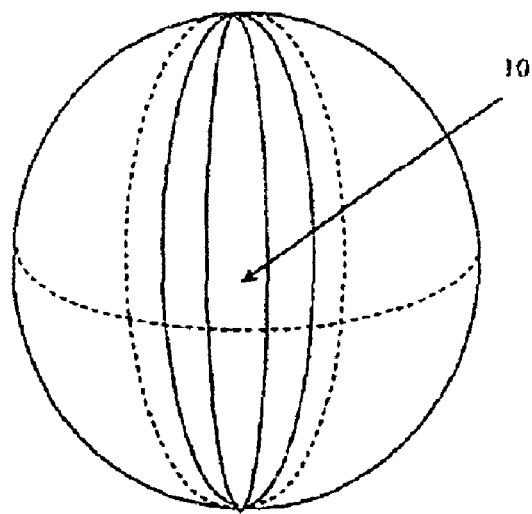
FIG. 6, a schematic diagram of a third embodiment of the method for determining a complex surface according to the invention.

FIGS. 5 and 6 diagrammatically show a third embodiment of the method for determining a complex surface of a progressive ophthalmic lens according to the invention.

This third embodiment is a generalization of the method of construction of the complex reseau surface according to the invention in the case where the initial surface is considered in non-Cartesian coordinates $(\alpha,\beta)$, for example spherical coordinates. In this embodiment it is possible to use the method of periodization—or quasi-periodization—on one of the coordinates $\alpha$ or $\beta$ or on a numerical function $\epsilon(\alpha,\beta)$ of these two coordinates, involved in the reference surface equation.

Adopting a position for example within a system of coordinates $(\alpha,\beta)$ which can be different from the Cartesian system $(x,y)$ the equation of the progressive initial surface in this system of coordinates is decomposition as follows:

$$S(\alpha,\beta)=S_0(\alpha,\beta)+\epsilon(\alpha,\beta)N_0(\alpha,\beta)$$

Where $S_0(\alpha,\beta)$ is the equation of a surface supporting the progressive surface, $N_0(\alpha,\beta)$ is the normal of this surface at the point $(\alpha,\beta)$. This supporting surface can for example be a sphere, and $\epsilon(\alpha,\beta)$ the remainder. This remainder can be symmetrical with respect to the axis $\alpha=0$ but this is not a restriction.

FIG. 5 shows such a modelling of a complex surface.

The method of construction of the periodized complex surface then consists of applying the periodization—or quasi-periodization—to this remainder.

$$\epsilon(\alpha,\beta) \rightarrow \epsilon(\alpha_{quasi\_periodic}(\alpha),\beta)$$

The quasi_periodic equation considered for this embodiment can be the equation quasi_periodic-1 or quasi_periodic-2 defined above with reference to FIGS. 3 and 4.

The constructed quasi-periodic complex surface $T(\alpha,\beta)$ can thus be defined by the relationship:

$$T(\alpha,\beta)=S_0(\alpha,\beta)+\epsilon(\alpha_{quasi\_periodic}(\alpha),\beta)N_0(\alpha,\beta)$$

The equation defined above remains valid when the meridian does not coincide with the axis $\alpha=0$.

Then let the equation of the meridian be $\alpha=\delta(\beta)$ and the constructed quasi-periodic complex surface $T(\alpha,\beta)$ is then defined as:

$$T(\alpha,\beta)=S_0(\alpha,\beta)+\epsilon(\alpha_{quasi\_periodic}(\alpha-\delta(\beta))+\delta(\beta),\beta)N_0(\alpha,\beta)$$

FIG. 6 shows the periodization of the complex surface in a system of spherical coordinates. The bands of the reseau are parallel if curve geometry is used.

Figure 7:
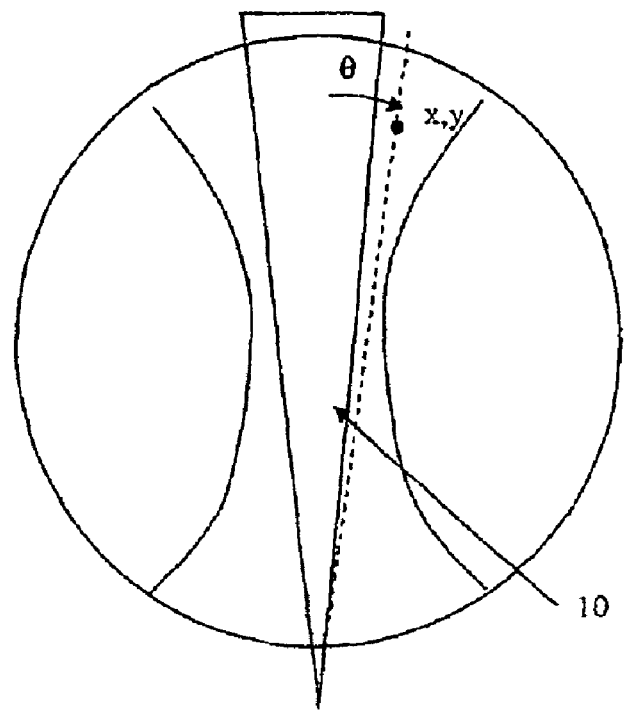
FIG. 7, a diagram showing the selection of the central band in a variant of the third embodiment of the method according to the invention.
Figure 8:
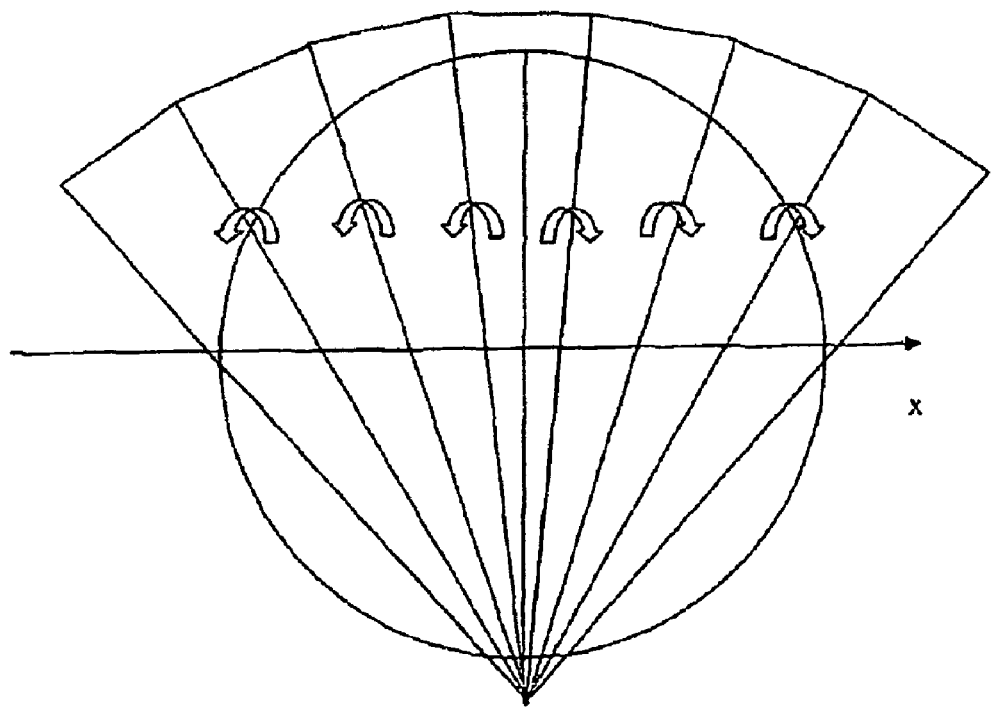
FIG. 8, a schematic diagram showing the construction of the complex surface from the central band of FIG. 7.

FIGS. 7 and 8 diagrammatically show a variant of this third embodiment of the method of construction of the complex reseau surface according to the invention in the case where the initial surface is considered in non-Cartesian coordinates. In this variant, cylindrical coordinates $(r,\theta)$ are used, and the method of periodization—or quasi-periodization—is used on the variable $\theta$.

FIG. 7 shows the central band 10 of the initial surface and FIG. 8 shows the periodized surface S' constructed with the following periodization function:

$$S'(r,\theta)=S(r\sin(\theta),y_0+r\cos(\theta))$$

With S the initial surface the vertex $(0,y_0)$ of which is situated outside the zone where the surface S is defined. In the case where the vertex is rejected to infinity, there is a return to the first embodiment as shown in FIG. 1.

If the surface of origin S is symmetrical along the vertical, this variant of the third embodiment ensures that the final surface S' will retain its continuous character. Moreover, the different quasi-periodization methods can also be used on the angular variable $\theta$.

Figure 9:
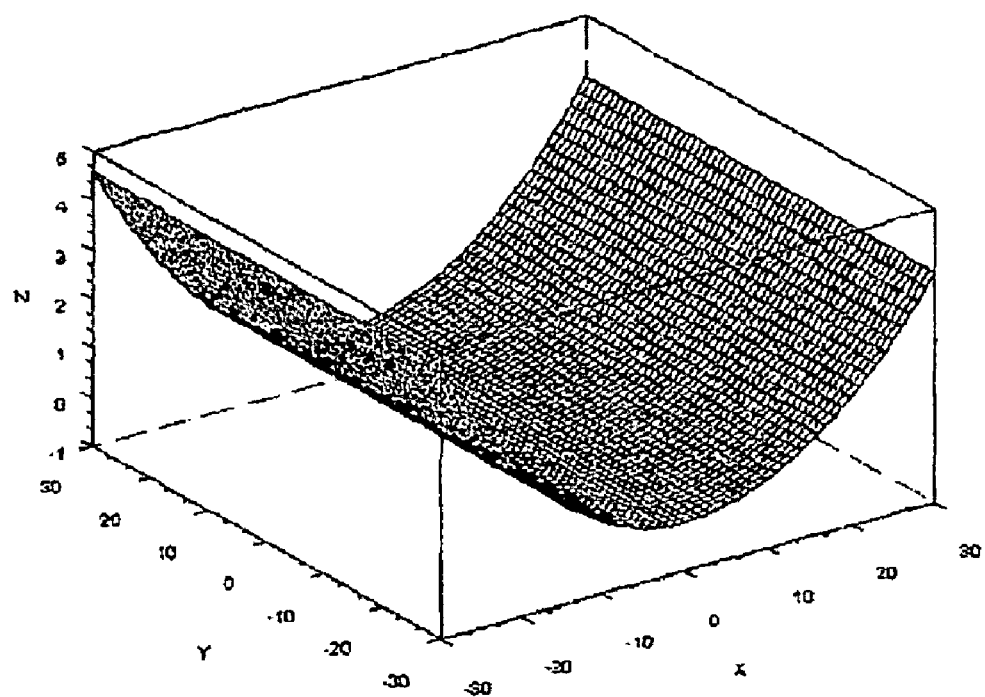
FIG. 9, a three-dimensional representation of the progressive surface obtained by the periodization of a central band according to the diagram of FIG. 1.

FIG. 9 shows the appearance of the complex surface constructed with the method of the invention according to the embodiment described in FIG. 1. Such a surface is not very aesthetic and causes thicknesses at the edges which make it difficult to mount the lens in a frame. In order to overcome this drawback, it is proposed to transform the complex initial surface before proceeding to the periodization step. This transformation can be a profiling of the surface in order to nullify the sphere at the far-vision control point VL and produce a flat far-vision progressive complex surface and having the prescribed addition A as sphere value at the near-vision control point VP. Such a method for the profiling of a complex surface is described in document U.S. Pat. No. 6,955,433. The transformation of the initial surface can also consist of a reduction of the near-vision sphere value, while retaining the same far-vision sphere value VL. The band selected for periodizing the initial surface will then have a smaller power addition along the meridian.

The method of construction by periodization or quasi-periodization of a selected central band, as described above, is then carried out with a selected central band on a complex surface corresponding to the initial surface minus the transformed initial surface.

Once the periodized complex surface has been constructed in this way, the sphere removed from the initial surface is added in order to produce a final complex surface having the required far-vision and near-vision sphere values.

Figure 10:
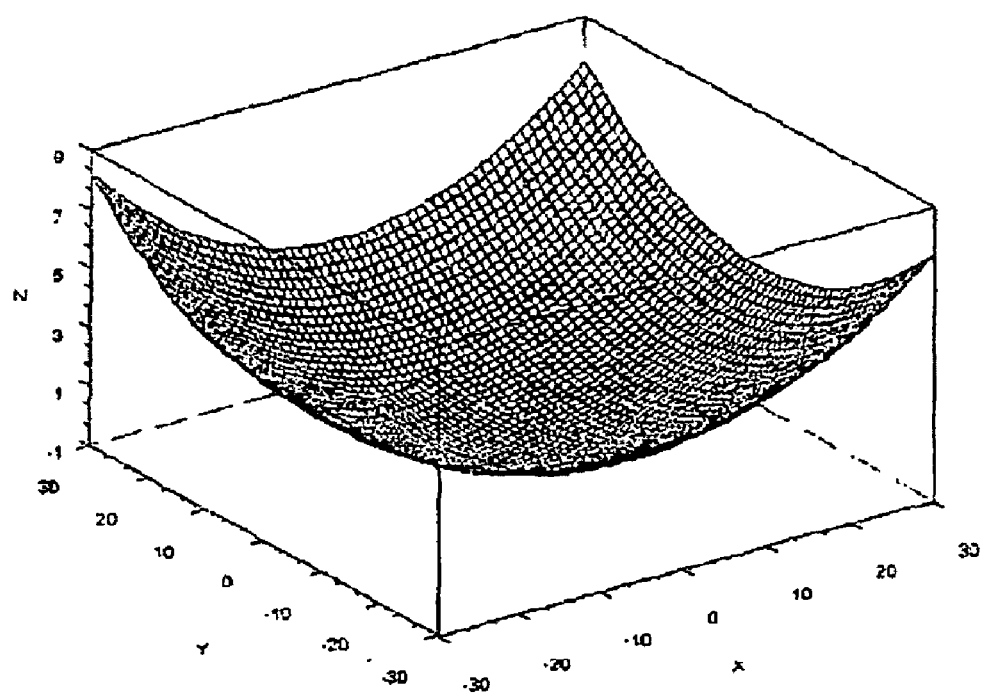
FIG. 10, a three-dimensional representation of the progressive surface obtained by the periodization of a central band constructed according to the diagram of FIG. 1.

With such a profiling method combined with the periodization method, a complex surface is obtained as shown in FIG. 10, which responds better to the constraints of a surface of an ophthalmic lens.

Such a construction of the complex surface according to the invention can be formalized as follows:

Let S be the initial surface and T the final complex surface constructed.

$$T = \text{Transf}_1(S) + P(S - \text{Transf}_2(S))$$

With $\text{Tranf}_1$ and $\text{Transf}_2$ the surface transformation operators.

And with P one of the periodization operators as defined above:

$$x_{quasi\_periodic\_1}(x) = x_{i[x]} + (x - \xi_{i[x]}) \quad \text{if } i[x] \text{ is even}$$
$$= x_{i[x]} - (x - \xi_{i[x]}) \quad \text{if } i[x] \text{ is odd}$$

$$x_{quasi\_periodic\_2}(x) = x_{i[x]} + (x - \xi_{i[x]}) \quad \text{if } i[x] \text{ is even}$$
$$= x_{i[x]-1} - (x - \xi_{i[x]}) \quad \text{if } i[x] \text{ is odd}$$

In general, $\text{Tranf}_1 = \text{Transf}_2$ will be obtained in order to achieve the prescription of the initial surface on the final surface.

Figure 11:
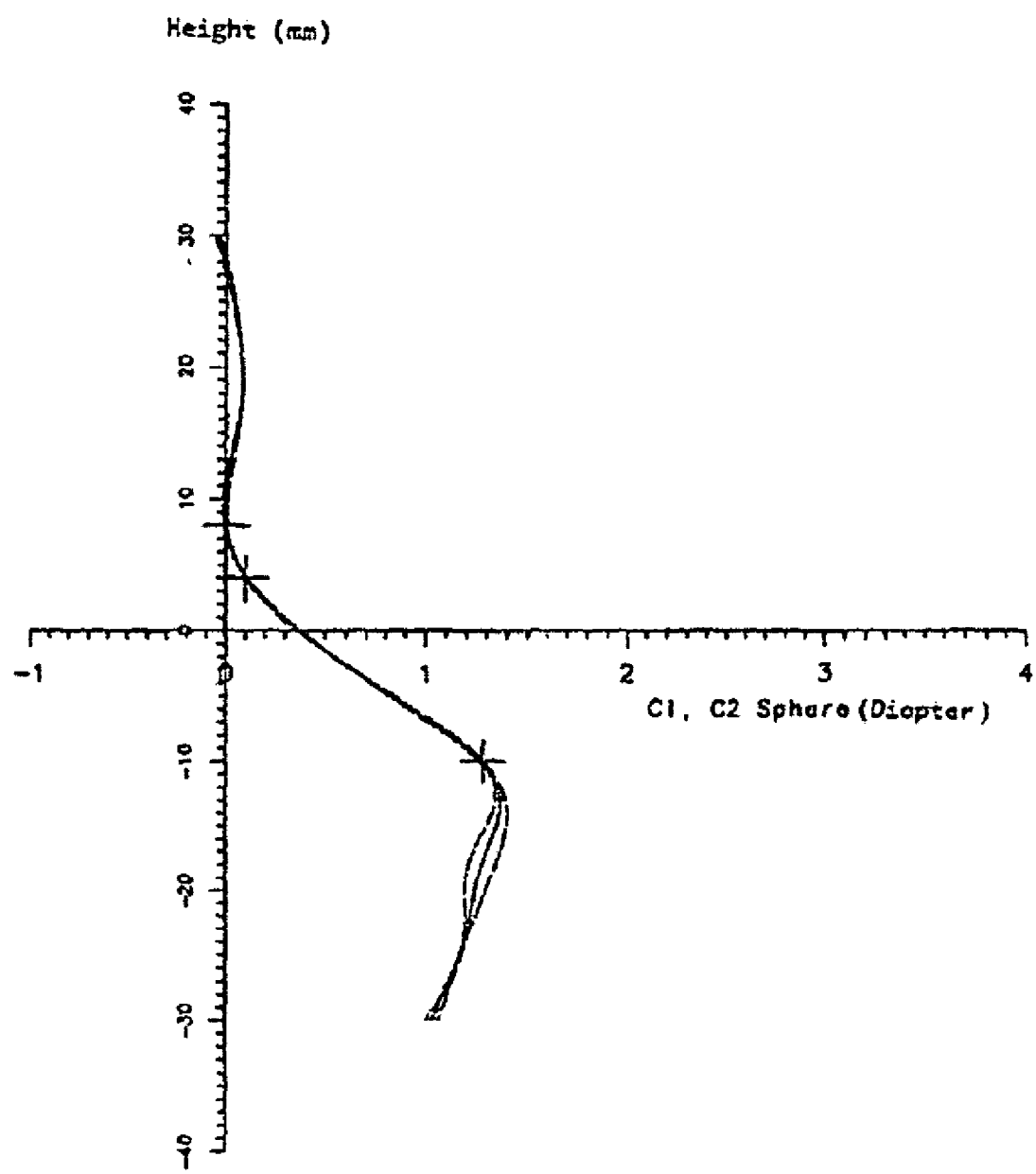
FIG. 11, a graph of the principal curvatures and of the sphere on the meridian of a lens according to a first embodiment of the invention.
Figure 13:
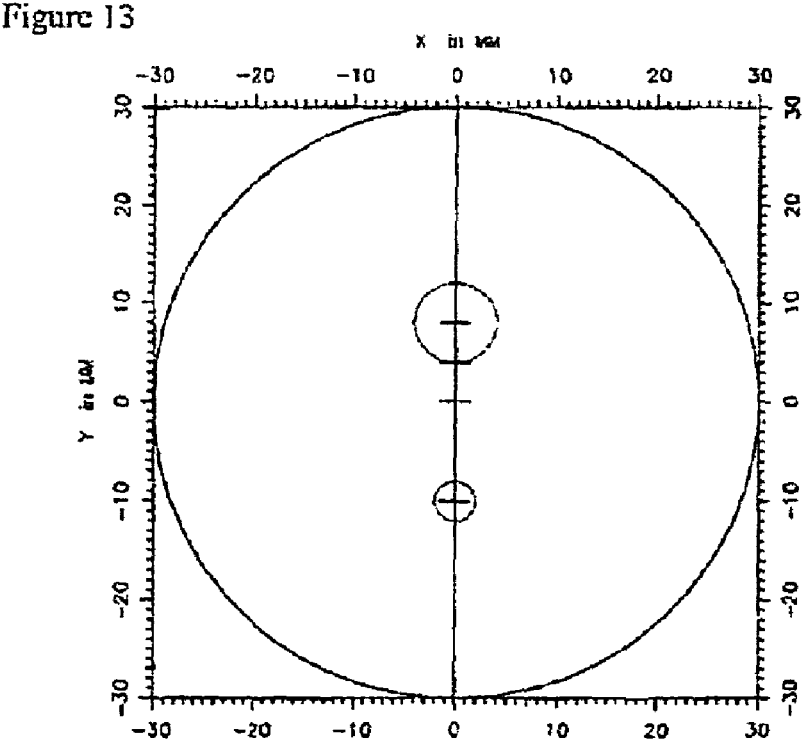

FIGS. 11 and 13 show a complex surface of a lens according to a first embodiment. The final complex surface is obtained by the periodization method shown in FIG. 1 with a reseau step of 2 mm. The complex surface of the initial lens has been transformed to nullify the sphere at the far-vision control point VL and produce a flat far-vision progressive complex surface for performing the surface periodization. The lens of this first example has a power addition prescription of +1.25 D.

FIG. 11 shows a diagram of the principal curvatures and the sphere on the meridian of a front face of a lens according to a first embodiment of the invention. The points on the complex surface of the lens are plotted in FIG. 11 and in FIGS. 12 and 13 with reference to an orthonormalized reference frame, having its origin at the geometric centre (0, 0) of the lens and the ordinate axis of which is vertical and the abscissa axis of which is horizontal. In FIG. 11 the curvature or the sphere is plotted on the abscissa axis in diopters; the position on the lens meridian is marked on the ordinate axis in millimetres. FIG. 11 also shows, on the ordinate axis at y=4 mm, a reference point called the fitting cross CM of the lens; this is a centering point produced on the lens which is used by the optician to fit the lens in the frame and corresponding to the primary direction of glance under the conditions when being worn. The fitting cross can be marked by a point produced on the lens, before fitting in the frame, by a cross or any other mark such as a point surrounded by a circle marked on the lens, or by any other appropriate means. In FIG. 11, a reference point indicating the far-vision control point VL, at y=8 mm on the ordinate axis, and a reference point indicating the near-vision control point VP, at y=−10 min on the ordinate axis are also plotted.

FIG. 11 shows the mean sphere as a solid line and, by broken lines, the principal curvatures $C_1 = (n-1)/R_1$ and $C_2 = (n-1)/R_2$ on the meridian. The values are reset to zero at the origin, where the mean sphere value is in fact 4.39 diopters. It is noted that the solid line and the broken lines coincide— representing a cylinder which is zero on the meridian of the complex surface of the lens.

Figure 12:
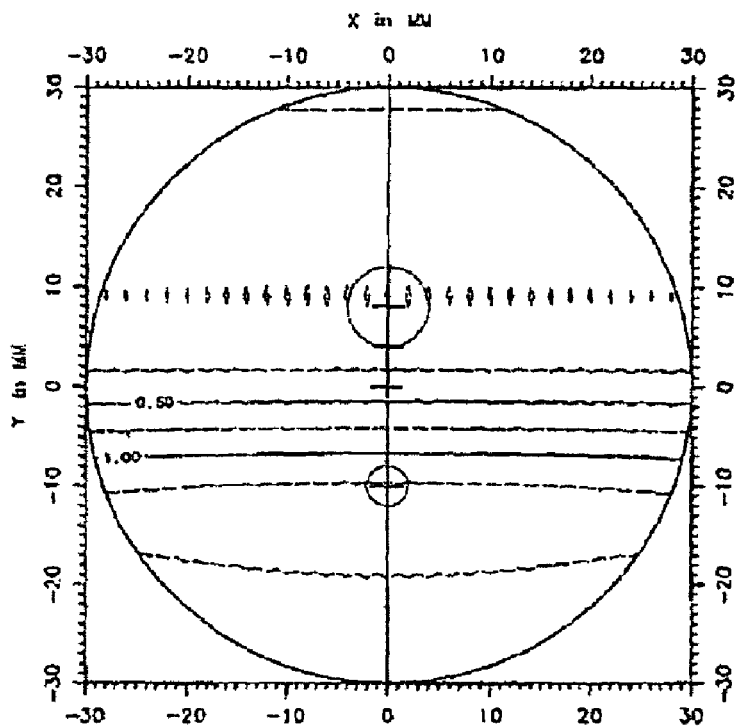
FIGS. 12 and 13, sphere and cylinder maps respectively of the lens of FIG. 11.

FIG. 12 shows a mean-sphere map of the front face the lens of FIG. 11; as is customary, the isosphere lines are plotted in FIG. 12 in an orthonormalized reference; these lines are formed from the points having the same mean sphere value. In FIG. 12 the 0 diopter to 1.25 diopter isosphere lines are represented in 0.25 diopter steps. FIG. 12 clearly shows the periodization of the complex surface of the lens. Adjacent vertical bands forming a horizontal reseau can be clearly identified from the repetition of horizontal sphere gradients ($\Delta\text{Sph}_x$). In particular, in the example shown, the sphere value remains substantially constant along a horizontal axis.

FIG. 13 shows a cylinder map of the front face of the lens of FIG. 11. It should be noted on FIG. 13 that the cylinder is almost zero—less than 0.25 diopter—over the whole of the periodized complex surface. Thus a progressive complex surface has been constructed with a cylinder which is imperceptible to the wearer over the whole of the surface.

FIGS. 14 to 21 show the optical characteristics of the lens of this first example by comparison with a reference lens used to define the complex initial surface. These figures show lenses comprising a prism of 0.86° with a geometric base orientated at 270° in the TABO reference. The plane of the glass is inclined with respect to the vertical by 8° (pantoscopic angle). A glass-to-eye distance of 27 mm was taken for the optical measurements on the lenses of FIGS. 14 to 21.

Figure 14:
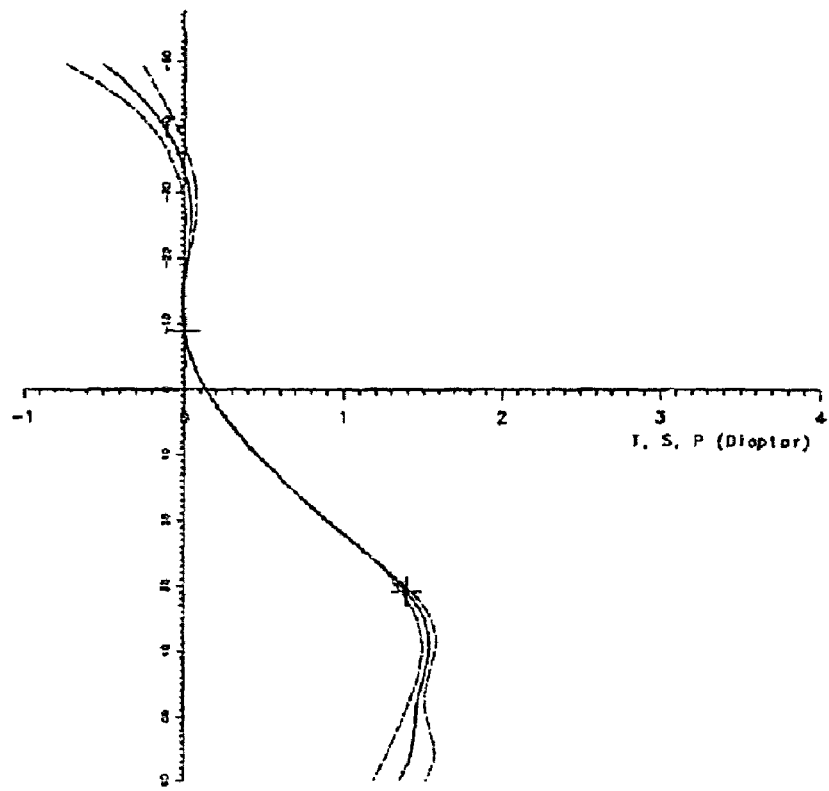
FIG. 14, a graph showing the wearer's optical power along the meridian of a lens according to the first embodiment of the invention.
Figure 15:
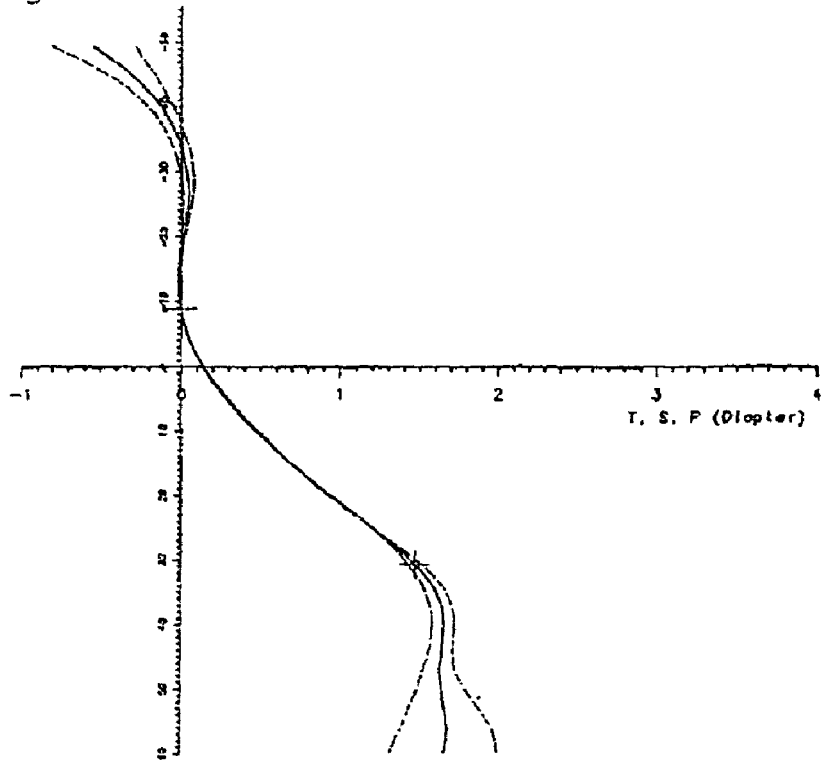
FIG. 15, a graph showing the wearer's optical power along the meridian of the reference lens used for selecting the central band to be periodized in order to define the lens of FIGS. 11 to 14.

FIGS. 14 and 15 show graphs of the wearer optical power along the meridian, respectively for a lens according to the invention and for the reference lens; the glance elevation angle β was plotted on the ordinate axis and the power in diopters on the abscissa axis. The minimum and maximum optical powers T, S were shown by broken lines and the optical power P by solid lines.

A wearer optical power which is substantially constant around the far-vision reference point VL, a wearer optical power which is substantially constant around the near-vision reference point VP and a regular power progression along the meridian can be noted in FIGS. 14 and 15. It will be noted that the wearer optical power progression (1.4 diopters) is greater than the prescribed power addition A (1.25 diopters). This difference in power value is due to oblique effects.

The similarity between the graphs of FIGS. 14 and 15 is of particular note. The lens of the invention thus has a principal progression meridian identical to that of the reference lens; the power addition is therefore well achieved on the lens of the invention.

Figure 16:
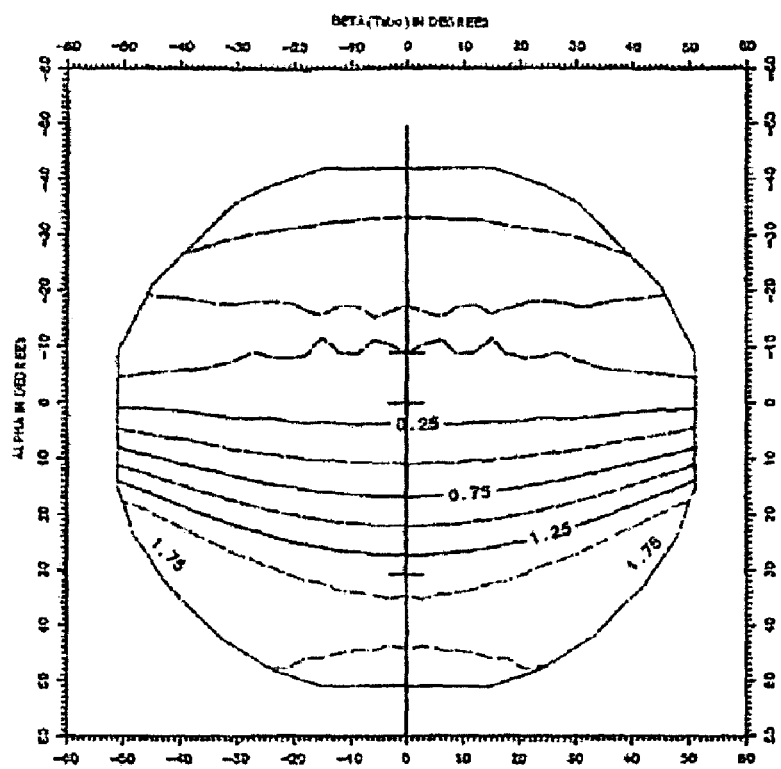
FIGS. 16 and 17, maps of the wearer's optical power respectively of the lens according to the first embodiment and the reference lens.
Figure 17:
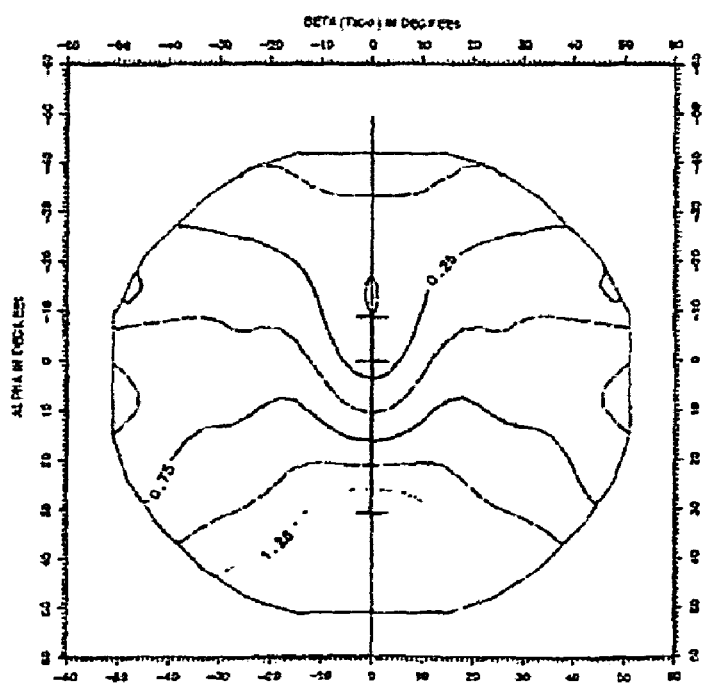

FIGS. 16 and 17 show the wearer optical power level lines defined in a direction of glance and for an object point respectively for a lens according to the invention and for the reference lens. As is customary, the isopower lines are plotted in FIGS. 16 and 17 in a reference frame in spherical coordinates: these lines are formed from points having the same optical power value P. The 0.25 diopter to 1.75 diopter isopower lines are represented.

It should be noted that the lens according to the invention has a substantially constant horizontal power distribution compared with the initial lens. It is also possible to identify bands on the lens from the repetition of the horizontal power gradients.

Figure 18:
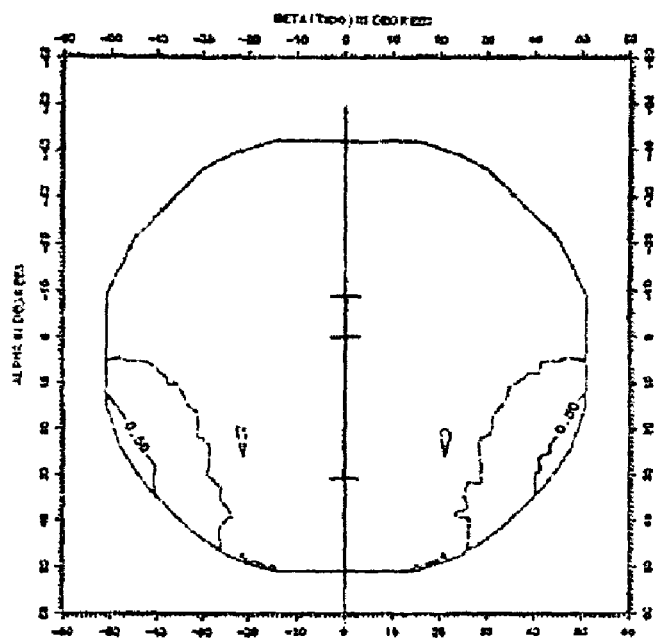
FIGS. 18 and 19, resulting astigmatism maps respectively on the lens according to the first embodiment and on the reference lens.
Figure 19:
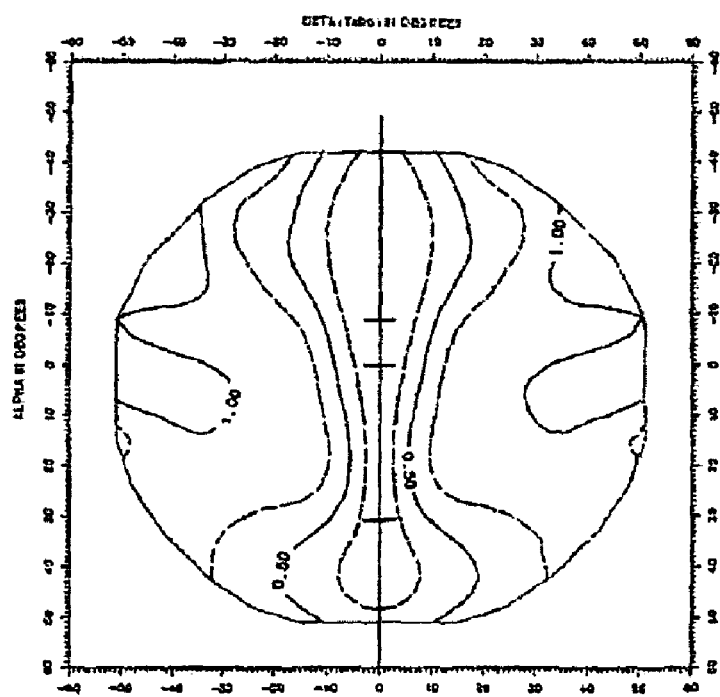

FIGS. 18 and 19 show the lines of the oblique astigmatism amplitude level when worn, respectively for a lens according to the invention and for the reference lens. As is customary, the iso-astigmatism lines were plotted in FIGS. 18 and 19 in a reference frame in spherical coordinates; these lines are formed from points having the same astigmatism amplitude value, as defined previously. The 0.25 diopter to 1.25 diopter isoastigmatism lines are represented.

It should be noted that the astigmatism has almost disappeared from the lens according to the invention. The residual astigmatism of FIG. 18 at the periphery of the lens according to the invention is due to the fact that the rays do not arrive perpendicular to the surface of the glass; this residual astigmatism is due to the oblique effects of the light rays and can be corrected by optimizing the opposing face to the surface opposite the face carrying the periodized surface. The lens of the invention therefore provides the wearer with an improved comfort in peripheral vision.

Figure 20:
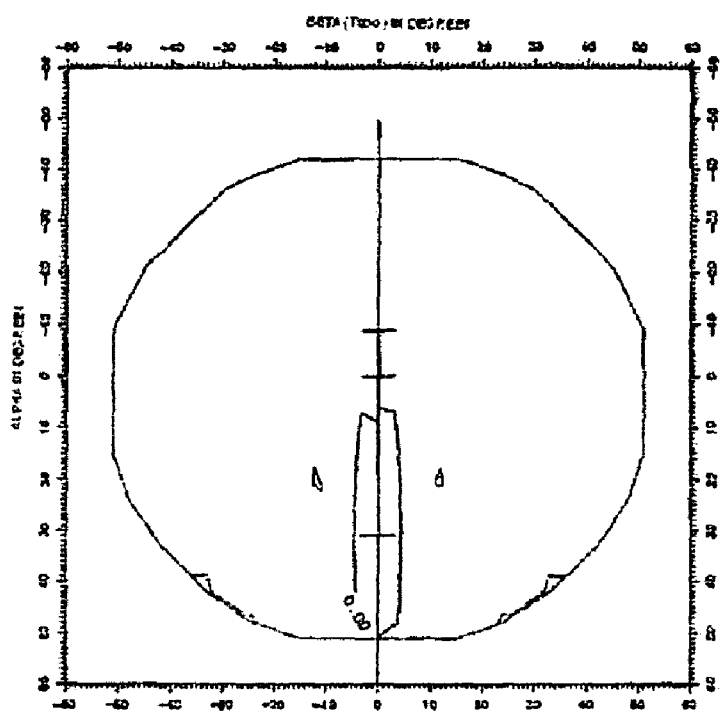
FIGS. 20 and 21, horizontal prismatic derivation maps respectively for the lens according to the first embodiment and for the reference lens.
Figure 21:
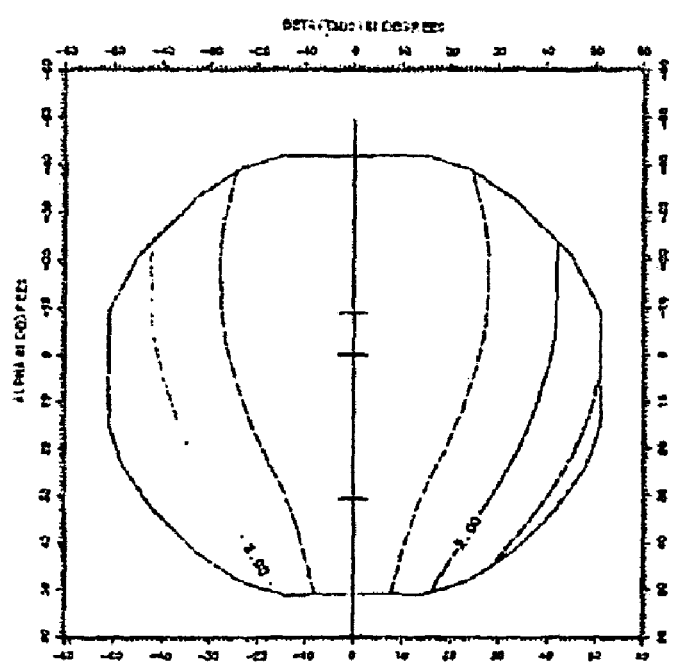

FIGS. 20 and 21 show the lines of the horizontal prismatic differentials level when worn, respectively for a lens according to the invention and for the reference lens.

It should be noted that the horizontal prismatic differentials have almost disappeared on the lens of the invention compared with the reference lens. The lens of the invention therefore provides the wearer with an improved comfort in peripheral vision.

Figure 22:
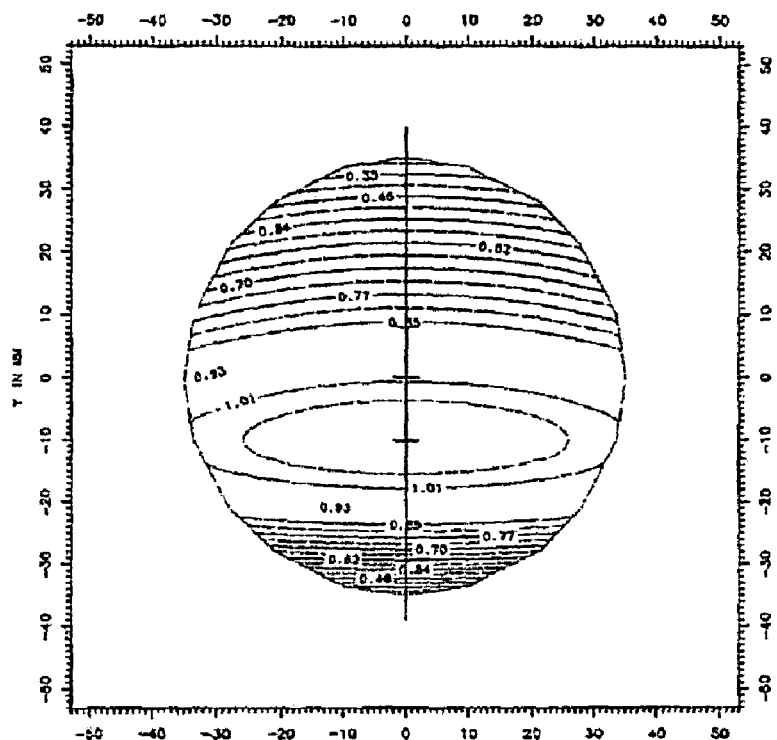
FIGS. 22 and 23, glass thickness maps respectively of the lens according to the invention and the reference lens.
Figure 23:
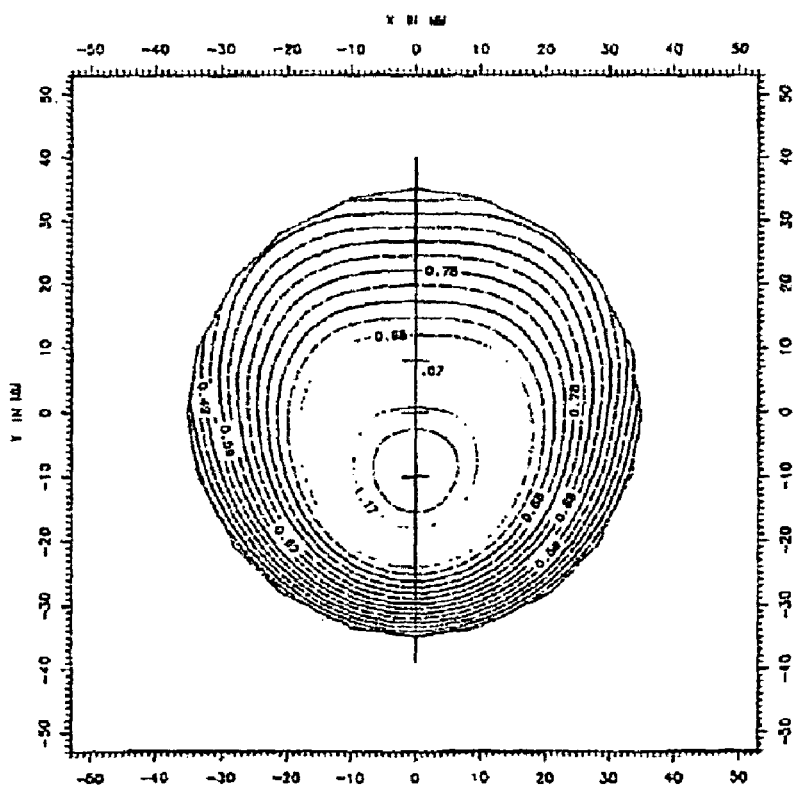

FIGS. 22 and 23 show the thickness of the glass, respectively for a lens according to the invention and for the reference lens. In FIGS. 22 and 23, lines formed from the points having the same thickness value are plotted in Cartesian coordinates.

The glass according to the invention has a centre thickness of 1.0 mm and an edge thickness of 0.32 mm. The glass of the reference lens has a centre thickness of 1.18 mm and an edge thickness of 0.3 mm. It should be noted that the lens according to the invention allows a thickness gain of 18% at the centre, which makes the weight of the glass lighter for the wearer.

FIGS. 24 to 29 illustrate a complex surface of a lens according to a second embodiment of the invention. The final complex surface is obtained by the method of periodization shown in FIG. 1 and the complex surface of the initial lens has been transformed on order to reduce the sphere value at the near-vision control point VP while retaining the far-vision sphere value VL and thus obtain a progressive complex surface having a reduced power addition—0.5 D in this example—along the meridian for carrying out the surface periodization. The lens of this second example has a power addition prescription of +1.25 D.

Figure 24:
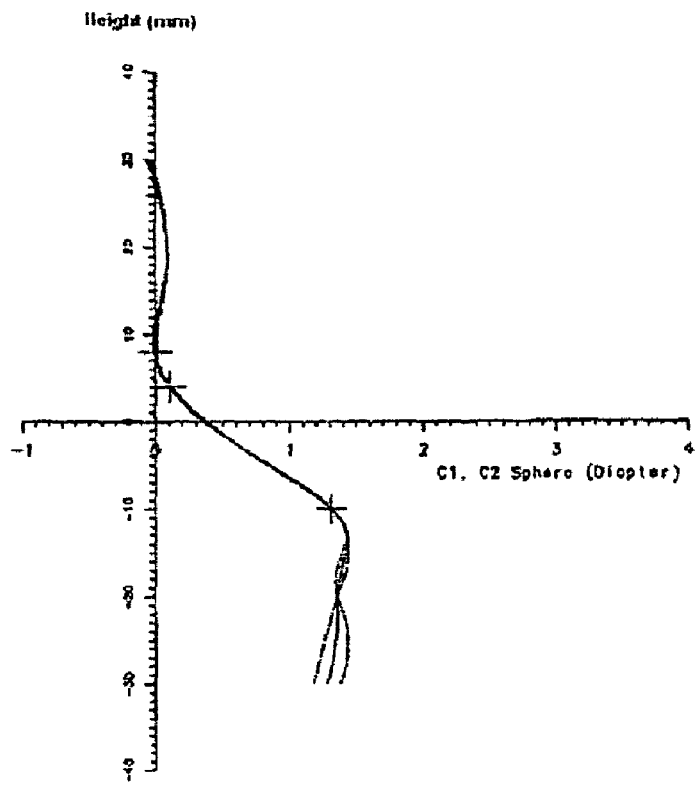
FIGS. 24 and 25, graphs of the principal curvatures and of the sphere on the meridian of a lens respectively according to a second embodiment of the invention and for a reference lens.
Figure 25:
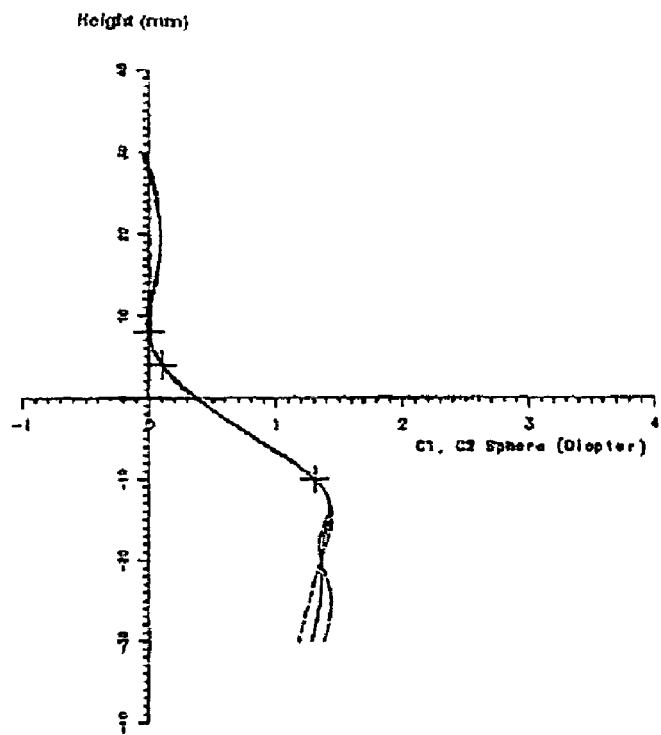

FIGS. 24 and 25 show, respectively for the lens according to the second embodiment and for the reference lens, a diagram of the principal curvatures and of the sphere on the meridian of a front face of the lens. The points on the complex surface of the lens are plotted with respect to an orthonormalized reference frame, with its origin at the geometric centre (0.0) of the lens, the ordinate axis being vertical and the abscissa axis horizontal. The curvature or the sphere is plotted on the abscissa axis in diopters; the position on the lens meridian is plotted on the ordinate axis in millimetres. FIGS. 24 and 25 show, on the ordinate axis at y=4 mm, a reference point designated as the fitting cross CM of the lens, a reference point indicating the far-vision control point VL, on the ordinate axis at y=8 mm, and a reference point indicating the near-vision control point VP on the ordinate axis at y=−10 mm.

FIGS. 24 and 25 show the mean sphere as a solid line and, by broken lines, the principal curvatures $C_1=(n-1)/R_1$ and $C_2=(n-1)/R_2$ on the meridian. The values are reset to zero at the origin, where the mean sphere value is in fact 4.26 diopters. It is noted that the solid line and the broken lines coincide—characteristic of a cylinder which is zero on the meridian of the complex surface of the lens.

The similarity between the graphs of FIGS. 24 and 25 is of particular note. The lens of the invention thus has a principal progression meridian identical to that of the reference lens; the power addition is therefore well achieved on the lens of the invention.

Figure 26:
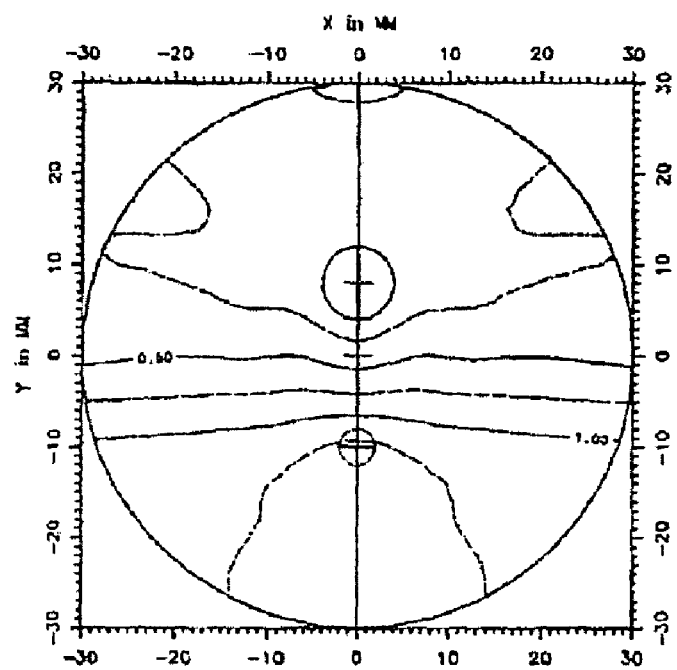
FIGS. 26 and 27, sphere maps respectively for the lenses of FIGS. 24 and 25.
Figure 27:
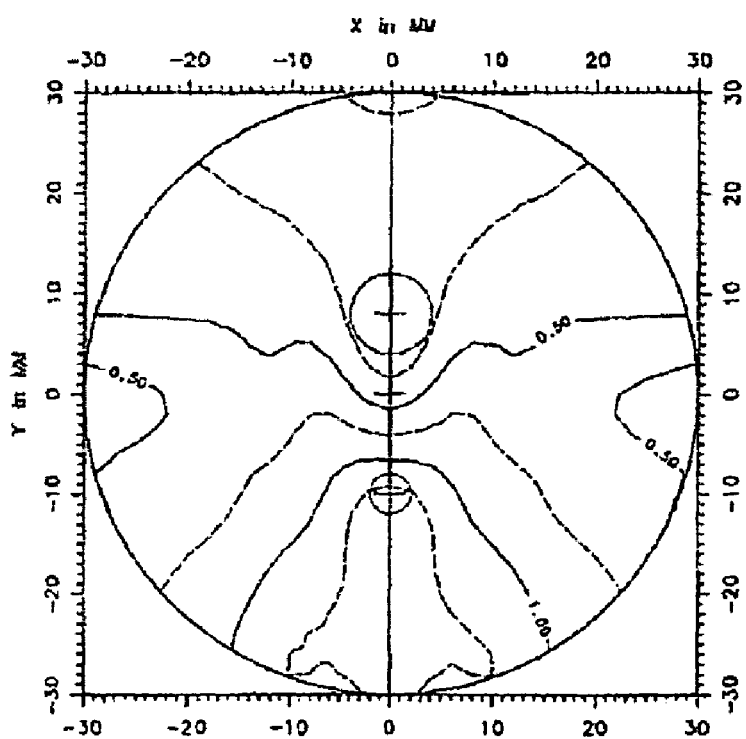

FIGS. 26 and 27 show, respectively for the lens according to the second embodiment and for the reference lens, mean sphere maps of the front face of the lenses of FIGS. 24 and 25; as is customary, the isosphere lines are plotted in an orthonormalized reference frame; these lines are formed from the points having the same mean sphere value. In FIGS. 26 and 27, 0 diopter to 1.25 diopter isosphere lines are represented in 0.25 diopter steps. FIG. 26 also shows the periodization of the complex surface of the lens. However, in this second example and in contrast to the first, the sphere value is not constant on each horizontal axis of the surface. In fact, the transformation operator chosen—reduction of the VP sphere—implies adding an addition to the periodized surface; thus introducing a non-zero horizontal sphere gradient to the horizontal reseau of bands constructed. It should be noted however that the horizontal sphere gradient is smaller for the lens of the invention (FIG. 26) compared with the reference lens (FIG. 27).

Figure 28:
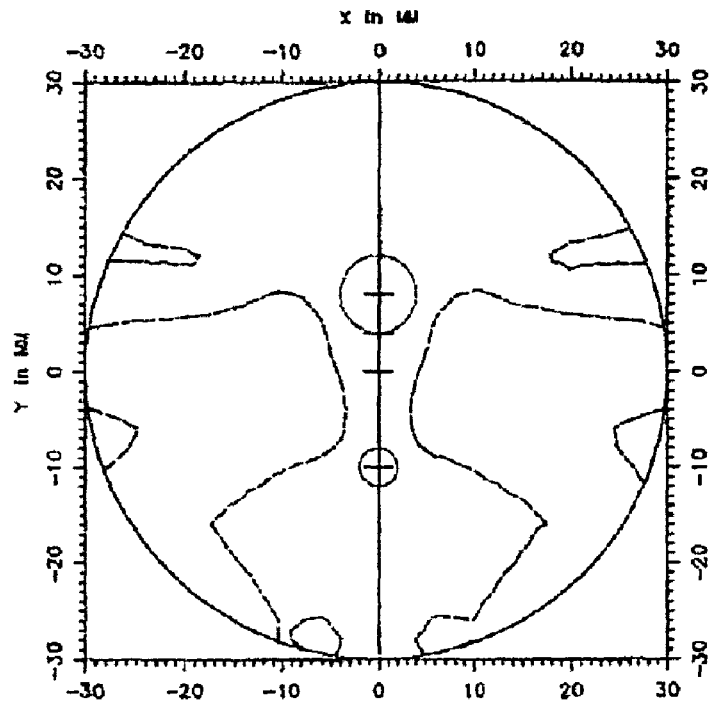
FIGS. 28 and 29, cylinder maps respectively for the lenses of FIGS. 24 and 25.
Figure 29:
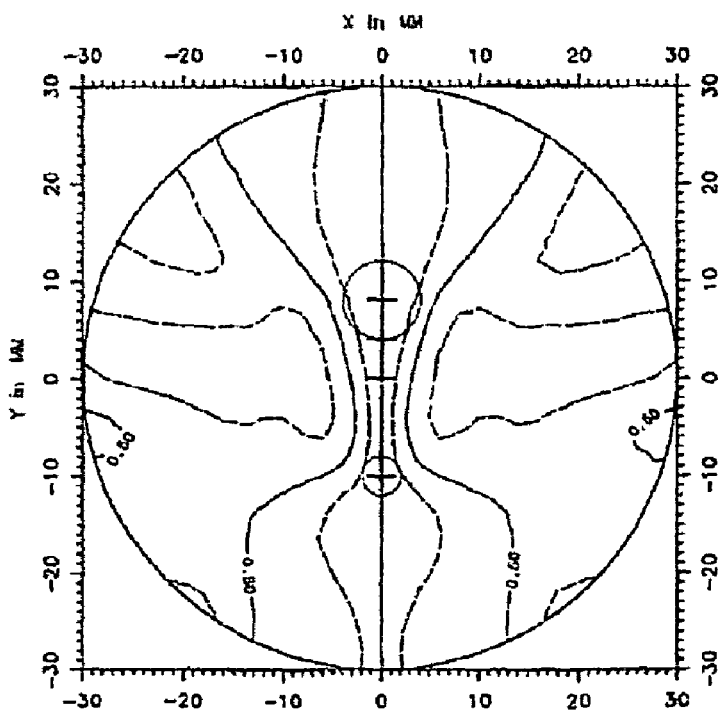

FIGS. 28 and 29 show respectively for the lens according to the second embodiment of the invention and for the reference lens, cylinder maps of the front face of the lenses of FIGS. 24 and 25.

It should be noted that the cylinder is markedly smaller on the surface of the lens according to the invention (FIG. 28) compared with the reference lens (FIG. 29). However, in this second example and in contrast to the first, the cylinder value is not substantially zero over the whole surface of the lens according to the invention. In fact, the transformation operator chosen—reduction of the VP sphere—implies adding an addition to the periodized surface; thus introducing a non-zero horizontal cylinder gradient over the complex surface constructed and thus of the cylinder.

FIGS. 30 to 37 show the optical characteristics of the lens of this second example by comparison with a reference lens used to define the complex initial surface. These figures show lenses comprising a prism of 0.95° with a geometric base orientated at 270° in the TABO reference. The plane of the lens is inclined with respect to the vertical by 8° (pantoscopic angle). A lens-eye distance of 27 mm was taken for the optical measurements on the lenses of FIGS. 30 to 37.

Figure 30:
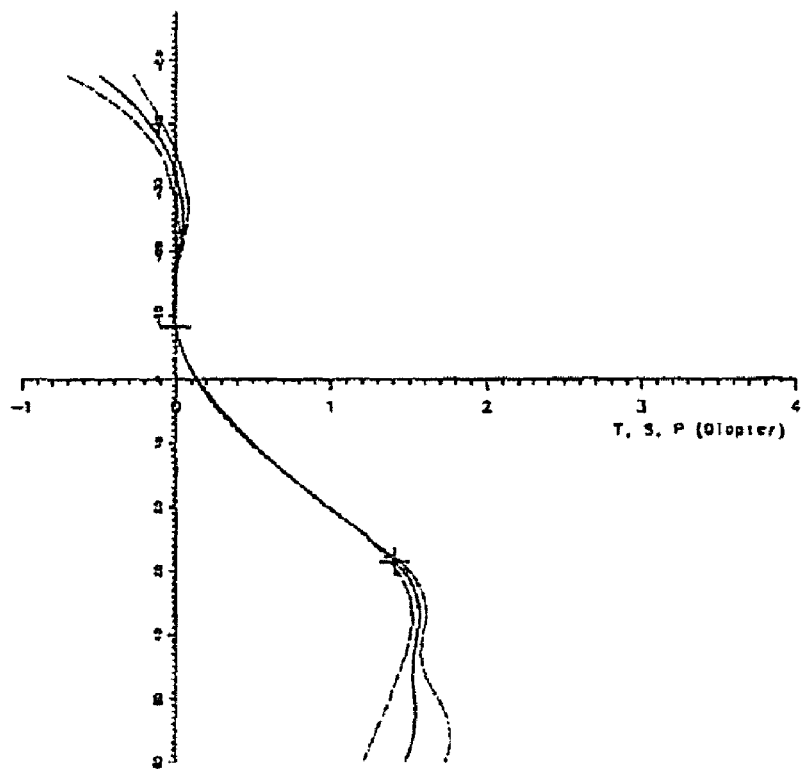
FIGS. 30 and 31, a graph showing the wearer's optical power along the meridian of a lens respectively according to a second embodiment of the invention and for a reference lens.
Figure 31:
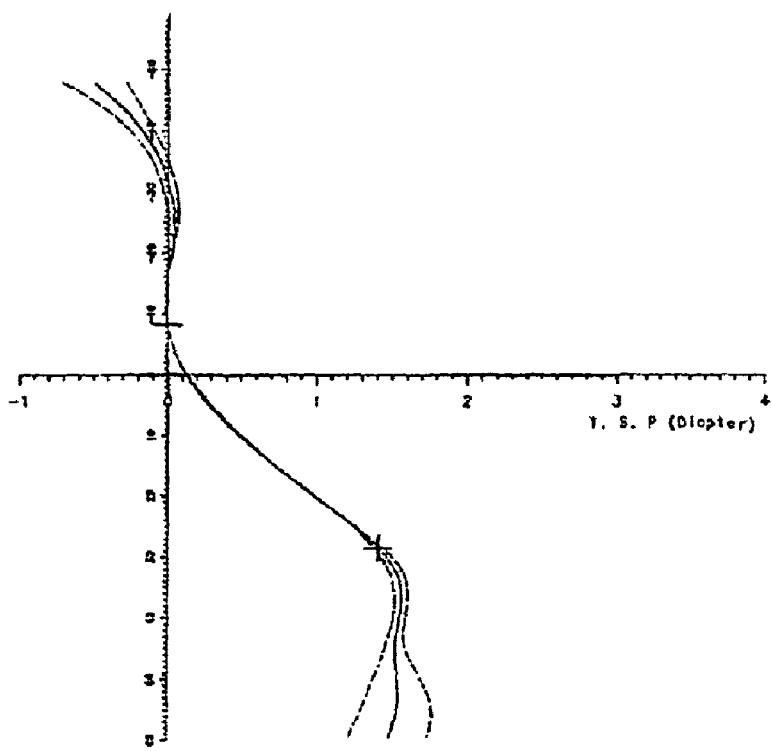

FIGS. 30 and 31 show graphs of the wearer optical power along the meridian, respectively for a lens according to the invention and for the reference lens; the glance elevation angle β was plotted on the ordinate axis and the power in diopters on the abscissa axis. The minimum and maximum optical powers T, S were shown by broken lines and the optical power P by solid lines.

A wearer optical power which is substantially constant around the far-vision reference point VL, a wearer optical power which is substantially constant around the near-vision reference point VP and a regular power progression along the meridian can be noted in FIGS. 30 and 31. It will be noted that the wearer optical power progression (1.4 diopters) is greater than the prescribed power addition A (1.25 diopters). This difference in power value is due to the oblique effects.

The similarity between the graphs of FIGS. 30 and 31 is of particular note. The lens of the invention thus has a principal progression meridian identical to that of the reference lens; the power addition is therefore well achieved on the lens of the invention.

Figure 32:
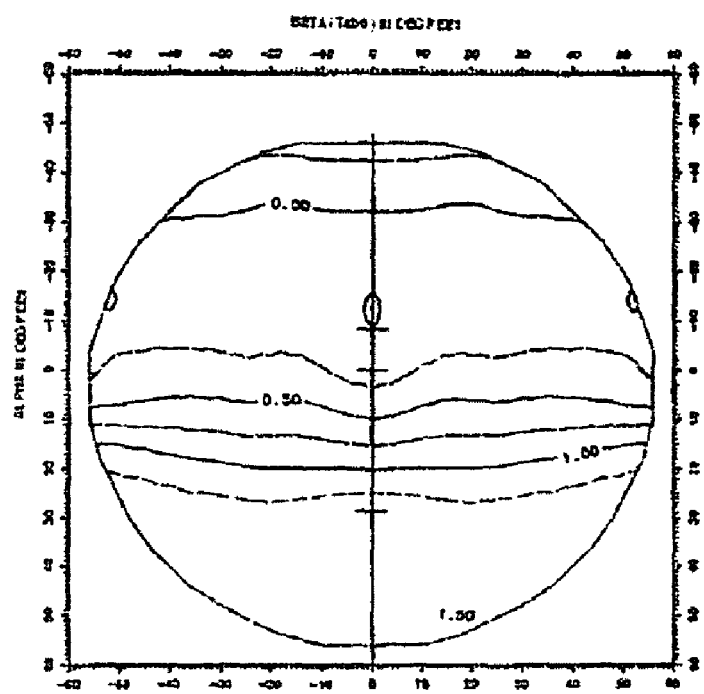
FIGS. 32 and 33, wearer's optical power maps respectively of the lens according to the second embodiment and the reference lens.
Figure 33:
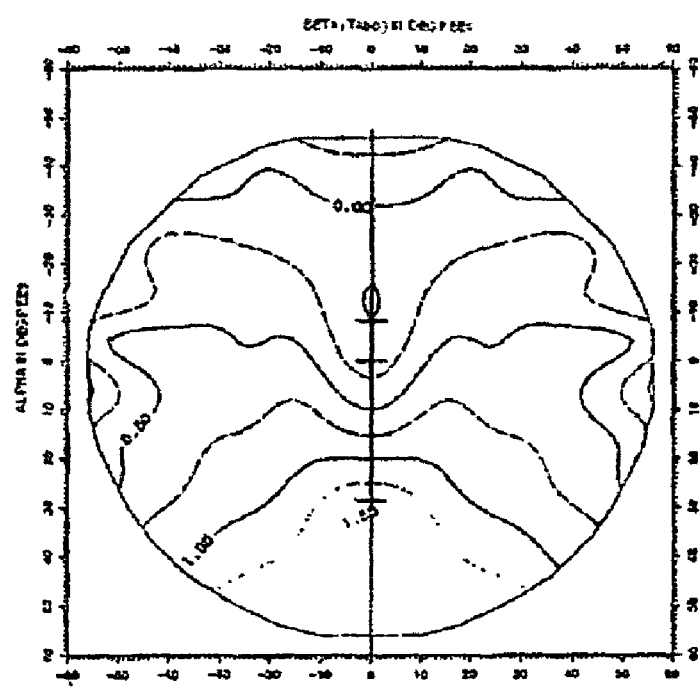

FIGS. 32 and 33 show the wearer optical power level lines defined in a direction of glance and for an object point respectively for a lens according to the invention and for the reference lens. As is customary, the isopower lines are plotted in FIGS. 32 and 33 in a reference frame in spherical coordinates; these lines are formed from points having the same optical power value P. The 0.25 diopter to 1.5 diopter isopower lines are represented.

It should be noted that the lens according to the invention has a substantially constant horizontal power distribution compared with the initial lens.

Figure 34:
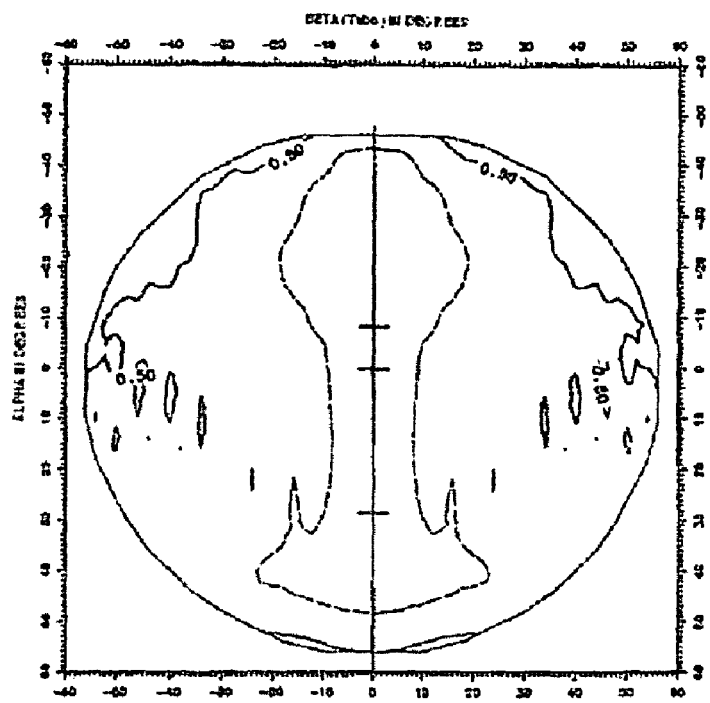
FIGS. 34 and 35, resulting astigmatism maps respectively on the lens according to the second embodiment and on the reference lens.
Figure 35:
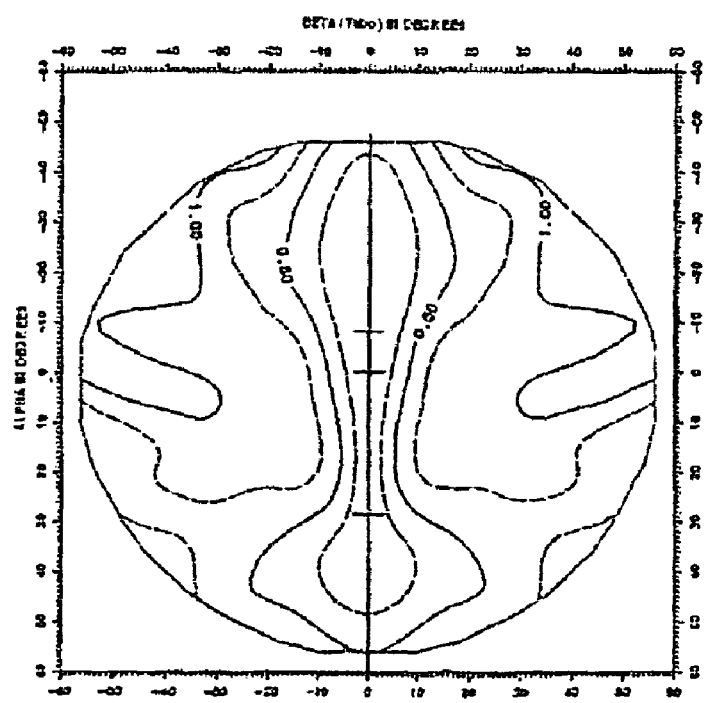

FIGS. 34 and 35 show the lines of the oblique astigmatism amplitude level when worn, respectively for a lens according to the invention and for the reference lens. As is customary, the iso-astigmatism lines are plotted in FIGS. 34 and 35 in a reference frame in spherical coordinates; these lines are formed from points having the same astigmatism amplitude value, as defined previously. The 0.25 diopter to 2.50 diopter isoastigmatism lines are represented.

It should be noted that the oblique astigmatism has been greatly reduced on the lens of the invention. The lens of the invention therefore provides the wearer with an improved comfort in peripheral vision.

Figure 36:
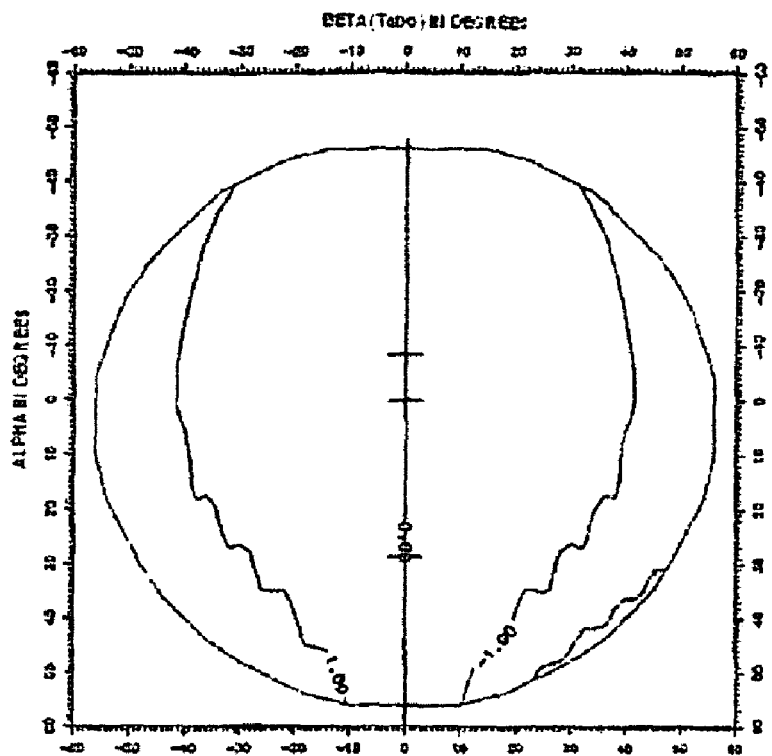
FIGS. 36 and 37, horizontal prismatic deviation maps respectively for the lens according to the second embodiment and for the reference lens.
Figure 37:
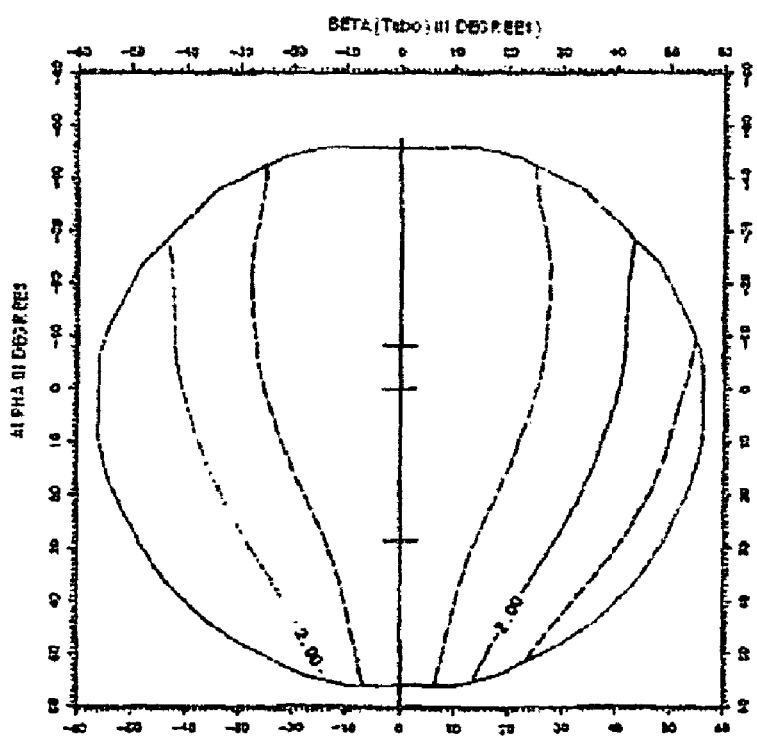

FIGS. 36 and 37 show the lines of the horizontal prismatic differentials level when worn, respectively for a lens according to the invention and for the reference lens.

It should be noted that the horizontal prismatic differentials have been substantially reduced on the lens of the invention compared with the reference lens. The lens of the invention therefore provides the wearer with an improved comfort in peripheral vision.

Figure 38:
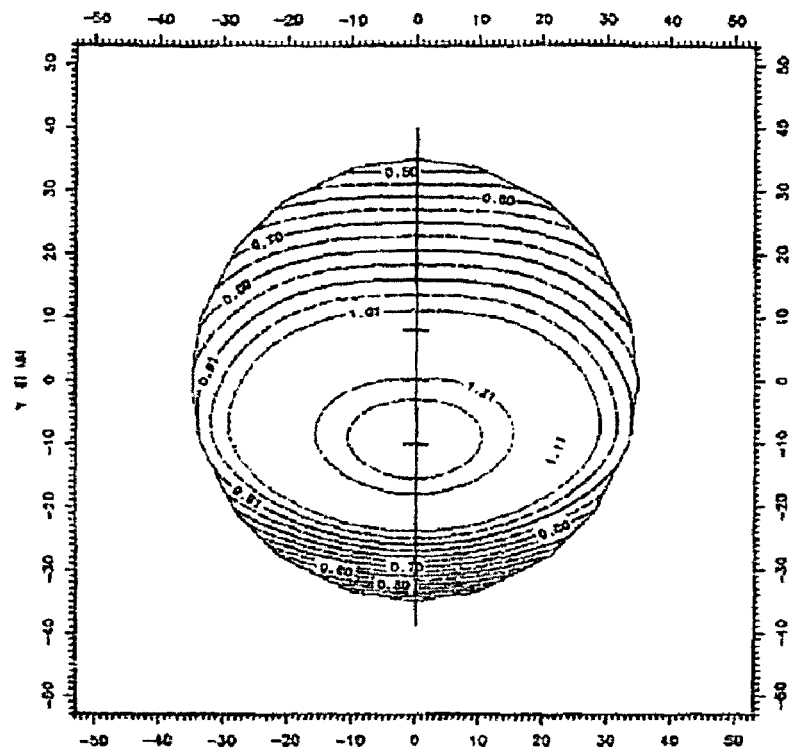
FIGS. 38 and 39, glass thickness maps respectively of the lens according to the invention and the reference lens.
Figure 39:
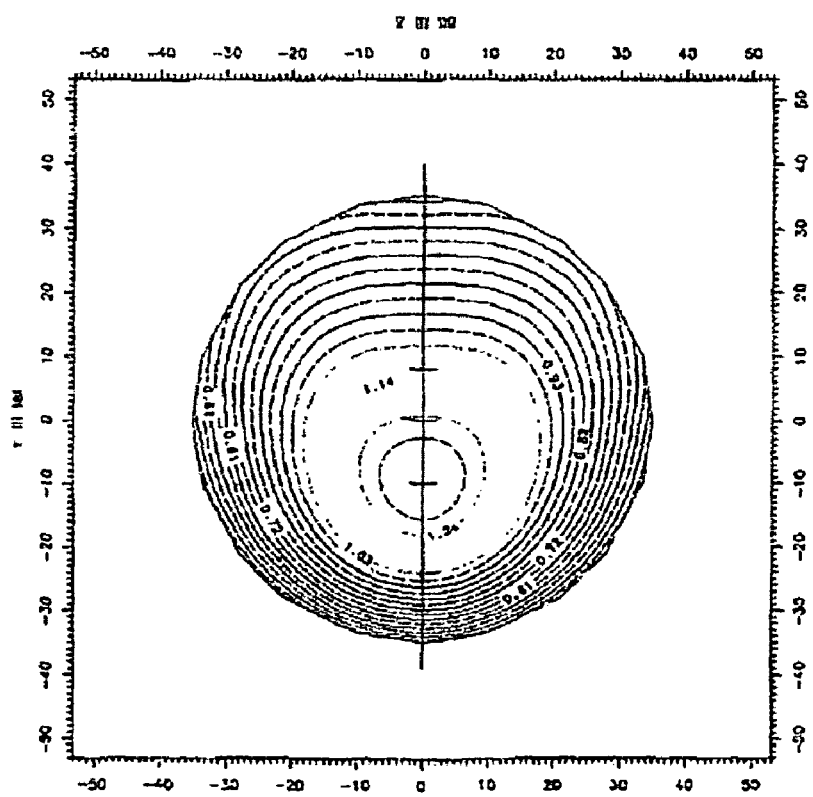

FIGS. 38 and 39 show the thickness of the glass, respectively for a lens according to the invention and for the reference lens. In FIGS. 38 and 39, lines formed from the points having the same thickness value are plotted in Cartesian coordinates.

The glass of the lens according to the invention has a centre thickness of 1.21 mm and an edge thickness of 0.30 mm. The glass of the reference lens has a centre thickness of 1.25 mm and an edge thickness of 0.30 mm. It should be noted that the lens according to the invention allows a thickness gain of 4% at the centre, which makes the weight of the glass lighter for the wearer.

The lens according to the invention provides an increased comfort to the wearer by substantially reducing the optical aberrations such as astigmatism, prismatic deviation and distortion.

The invention has been described with reference to particular examples from a given complex initial surface. It is understood that other initial surfaces can be used for selecting the central band to be reproduced in order to form the periodized or quasi-periodized complex surface according to the invention. It is also understood that the roles of front and rear faces can be reversed without exceeding the scope of the invention. A person skilled in the art will also easily understand that the lens under consideration can have two periodized or quasi-periodized complex surfaces arranged on two faces of a single glass or distributed on two glass layers assembled to form a lens.

The invention claimed is:

1. A progressive ophthalmic lens comprising:
    at least one complex surface having a principal progression meridian having a progressive variation of a horizontal prismatic refringence power, said complex surface having a horizontal reseau of bands, the reseau of bands being formed by a succession of bands along a horizontal axis, at least one geometrical quantity of the complex surface being substantially equal in all the bands of the reseau of bands for a given point of a vertical.

2. The lens of claim 1, wherein the geometrical quantity of the complex surface substantially equal in all the bands of the reseau of bands comprises one or more of sphere or cylinder values, horizontal or vertical differentials of sphere or cylinder, altitude values of points, and horizontal or vertical differentials of an altitude.

3. The lens of claim 1, wherein the reseau of bands of the complex surface is periodic.

4. The lens of claim 1, wherein the reseau of bands of the complex surface is quasi-periodic.

5. The lens of claim 1, wherein the reseau of bands of the complex surface has a central band centred on the principal progression meridian.

6. The lens of claim 5, wherein the central band has a width comprising between about 0.1 mm and about 10 mm.

7. The lens of claim 1, wherein the reseau of bands of the complex surface has a central band in which a cylinder variation is less than or equal to 0.25 diopter.

8. The lens of claim 1, wherein the principal progression meridian is substantially umbilical.

9. The lens of claim 1, wherein the complex surface is symmetrical with respect to the principal progression meridian.

10. A method for determining a complex surface of a progressive ophthalmic lens, the method comprising:
    choosing a complex initial surface having a principal progression meridian with a power addition between a far-vision reference point and a near-vision reference point;
    selecting a central band including the principal progression meridian;
    reproducing the selected central band on each side of the principal progression meridian;
    transforming the complex initial surface with a first transformation operator; and
    constructing the complex surface of the lens by successively reproducing selected bands towards the periphery of the lens, the constructing operation comprising constructing a complex periodic or quasi-periodic surface by successively reproducing the selected bands on a surface corresponding to the complex initial surface minus the transformed complex initial surface and adding to the complex periodic or quasi-periodic surface an initial surface transformed with a second transformation operator.

11. The method of claim 10, wherein the first transformation operator annuls a sphere value at the far-vision reference point.

12. The method of claim 10, wherein the first transformation operator reduces a sphere value at the near-vision reference point.

13. The method of claim 10, wherein the first transformation operator and the second transformation operator are identical.

14. The method of claim 10, wherein reproducing the selected band comprises juxtaposing the selected band.

15. The method of claim 10, wherein reproducing the selected band comprises making the selected band symmetrical.

16. The method of claim 10, wherein constructing the complex surface of the lens further comprises translating an enlarged or reduced central band to juxtapose the central band with constructed bands.

17. A visual device comprising:
    at least one lens presenting at least one complex surface having a principal progression meridian having a progressive variation of a horizontal prismatic refringence power, said complex surface having under the conditions when being worn, a horizontal reseau of bands, the reseau of bands being formed by a succession of bands along a horizontal axis, at least one geometrical quantity of the complex surface being substantially equal in all bands of the reseau for a given point of the vertical.

* * * * *